United States Patent
Hattori et al.

(10) Patent No.: US 8,511,278 B2
(45) Date of Patent: Aug. 20, 2013

(54) CONTROL UNIT AND CONTROL METHOD FOR VARIABLE VALVE TIMING MECHANISM

(75) Inventors: Masayoshi Hattori, Toyota (JP); Tsukasa Abe, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 307 days.

(21) Appl. No.: 12/594,349

(22) PCT Filed: Apr. 11, 2008

(86) PCT No.: PCT/IB2008/000877
§ 371 (c)(1),
(2), (4) Date: Oct. 2, 2009

(87) PCT Pub. No.: WO2008/125949
PCT Pub. Date: Oct. 23, 2008

(65) Prior Publication Data
US 2010/0037842 A1 Feb. 18, 2010

(30) Foreign Application Priority Data
Apr. 11, 2007 (JP) ................................. 2007-103884

(51) Int. Cl.
*F02D 13/04* (2006.01)
*B60K 31/02* (2006.01)

(52) U.S. Cl.
USPC ......................................... 123/321; 180/178

(58) Field of Classification Search
USPC .......... 123/321, 322, 339.22, 339.24, 339.25, 123/339.1, 345, 347, 90.11, 90.15, 90.18, 123/339.14, 339.19, 339.2, 346, 348; 701/93, 701/98, 102, 103, 106, 110, 113; 180/170, 180/178, 179
See application file for complete search history.

(56) References Cited

U.S. PATENT DOCUMENTS

| | | | | |
|---|---|---|---|---|
| 5,293,741 A | * | 3/1994 | Kashiyama et al. | ............ 60/284 |
| 6,026,921 A | * | 2/2000 | Aoyama et al. | ............ 180/65.25 |
| 6,308,671 B1 | | 10/2001 | Reed et al. | |
| 6,397,800 B2 | * | 6/2002 | Nohara et al. | ............ 123/90.15 |
| 6,705,259 B1 | | 3/2004 | Sellnau et al. | |
| 2001/0050066 A1 | * | 12/2001 | Sugiyama et al. | ......... 123/90.17 |
| 2002/0198683 A1 | | 12/2002 | Yoshiki et al. | |
| 2003/0172888 A1 | | 9/2003 | Miura | |

(Continued)

FOREIGN PATENT DOCUMENTS

| | | |
|---|---|---|
| EP | 1 164 259 | 12/2001 |
| EP | 1 344 897 | 9/2003 |
| EP | 1 686 250 | 8/2006 |
| JP | 60 17235 | 1/1985 |

(Continued)

*Primary Examiner* — Stephen K Cronin
*Assistant Examiner* — Sherman Manley
(74) *Attorney, Agent, or Firm* — Oblon, Spivak, McClelland, Maier & Neustadt, L.L.P.

(57) ABSTRACT

An idling-time target phase setting unit (130) variably sets a target phase based on a target idle speed that is set by a target idle speed setting unit. (110) Especially, when the target idle speed is lower than a predetermined rotational speed and operating noise of a variable valve timing mechanism (2000) is easily heard by, for example, a driver, the idling-time target phase setting unit (130) sets the target phase so that a range, in which the valve phase is allowed to change, is restricted within a phase region where a speed reduction ratio is high and the operating noise is relatively low.

24 Claims, 15 Drawing Sheets

(56) References Cited

U.S. PATENT DOCUMENTS

2005/0061277 A1  3/2005  Takenaka et al.
2006/0090728 A1* 5/2006  Arinaga et al. .......... 123/339.19
2006/0180108 A1  8/2006  Yasui

FOREIGN PATENT DOCUMENTS

| JP | 5 44515    | 2/1993 |
| JP | 2005 98142 | 4/2005 |
| JP | 2007 9794  | 1/2007 |

* cited by examiner

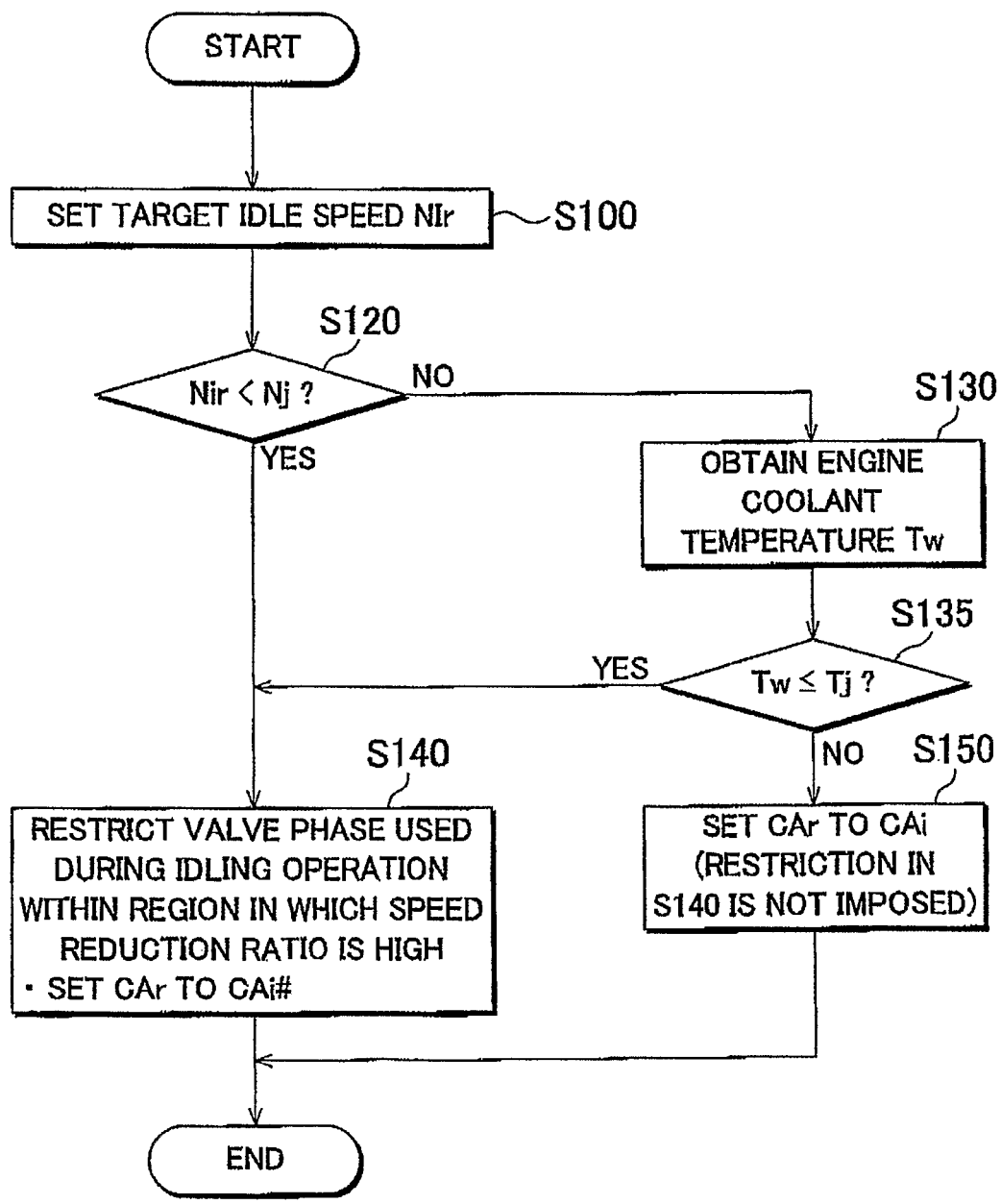

CONTROL UNIT AND CONTROL METHOD FOR VARIABLE VALVE TIMING MECHANISM

BACKGROUND OF THE INVENTION

1. Field of the Invention

The invention relates generally to a control unit and control method for a variable valve timing mechanism. More specifically, the invention relates to a variable valve timing control that is executed when an internal combustion engine is idling.

2. Description of the Related Art

A variable valve timing (VVT) mechanism that changes the phase (i.e., crank angle), at which an intake valve or an exhaust valve is opened/closed, based on the engine operating state has been used. Such variable valve timing mechanism changes the phase of the intake valve or the exhaust valve by rotating a camshaft, which opens/closes the intake valve or the exhaust valve, relative to, for example, a sprocket. The camshaft is rotated hydraulically or by means of an actuator, for example, an electric motor. It is more difficult to obtain the torque for rotating the camshaft, when the camshaft is rotated by the electric motor than when the camshaft is hydraulically rotated. Therefore, when the camshaft is rotated by the electric motor, usually, the torque generated by the electric motor is transferred to the camshaft via, for example, a link mechanism to rotate the camshaft.

Japanese Patent Application Publication No. 2005-98142 (JP-A-2005-98142) describes a valve timing adjustment device which is a type of the above-described variable valve timing mechanism and which changes the direction, in which a target phase is changed, within a short time. In the valve timing adjustment device described in JP-A-2005-98142, as shown in FIGS. 16 and 18, the change ratio (corresponding to the inclination of the tangent line in the graph in each of FIGS. 16 and 18) of a change amount of the rotational phase of a camshaft relative to a crankshaft (i.e., change amount of the valve phase) with respect to a change amount of the rotational phase of a guide rotational body, which rotates in accordance with the operation of an actuator, is changed based on the phase region.

Usually, when an engine is idling, a target value of a valve phase is set to a predetermined value that is suitable for the idling operation. In contrast, in a variable valve timing mechanism with which the change ratio is variably set based on the valve phase region, there is a possibility that the change ratio at the valve phase suitable for the idling operation may not be appropriate depending on the range, in which the phase is allowed to change and which needs to be ensured to deal with various operating states. In addition, when a target idle speed for the engine is variably set based on the vehicle state, it is necessary to derive an appropriate manner for setting the valve phase in accordance with the variably set target idling speed. In the variable valve timing mechanism described above, it is necessary to derive an appropriate manner for setting the valve phase which is used during the idling operation in order to place the valve phase within a region, in which the change ratio is appropriate, when the engine stops. As described above, in the variable valve timing mechanism with which the change ratio of the change amount of the valve phase with respect to the operation amount of the actuator (speed reduction ratio) changes based on the valve phase, it is necessary to take the relationship between the valve phase and the speed reduction ratio into account in order to execute an appropriate valve phase control during the idling operation.

SUMMARY OF THE INVENTION

The invention provides a technology for appropriately controlling a valve phase when an internal combustion engine is idling, using a variable valve timing mechanism that is configured in such a manner that a ratio of a change amount of a valve phase with respect to an operation amount of an actuator (speed reduction ratio) changes based on the valve phase.

A first aspect of the invention relates to a control unit for a variable valve timing mechanism that changes opening/closing timing of at least one of an intake valve and an exhaust valve of an internal combustion engine by a change amount that corresponds to an operation amount of an actuator. The control unit includes a target idle speed setting unit and a phase restriction unit. The variable valve timing mechanism is configured in such a manner that a control range, in which the opening/closing timing is allowed to be controlled by the variable valve timing mechanism, includes a first region and a second region, and a ratio of the change amount of the opening/closing timing with respect to the operation amount of the actuator is higher when the opening/closing timing is within the first region than when the opening/closing timing is within the second region. The target idle speed setting unit variably sets a target rotational speed for the internal combustion engine, which is used when the internal combustion engine is idling, based on a vehicle state. The phase restriction unit restricts a range, in which the opening/closing timing is changed by the variable valve timing mechanism, within the first region, when the target rotational speed that is set by the target idle speed setting unit is lower than a predetermined rotational speed.

A second aspect of the invention relates to a control method for the variable valve timing mechanism in the first aspect of the invention. According to the control method, a target rotational speed for the internal combustion engine, which is used when the internal combustion engine is idling, is variably set based on a vehicle state. When the target rotational speed for the internal combustion engine is lower than a predetermined rotational speed while the internal combustion engine is idling, a range, in which the opening/closing timing is changed by the variable valve timing mechanism, is restricted within the first region.

With the control unit and control method described above, when the target idle speed for the internal combustion engine is variably set based on the vehicle state (e.g. selected shift position or shift range), if the target idle speed is set to a value lower than the predetermined rotational speed and an occupant of the vehicle easily hears operating noise of the variable valve timing mechanism, the range, in which the valve phase is allowed to change, is restricted within the region in which the ratio of the change amount of the opening/closing timing (valve phase) with respect to the operation amount of the actuator is high. As a result, the valve phase is controlled within the phase region (first region) in which it is relatively difficult to transmit an external rotational force to the inside of the variable valve timing mechanism and the operation speed of each element in the variable valve timing mechanism is relatively low. Therefore, it is possible to make the operating noise of the variable valve timing mechanism relatively low so that the vehicle occupant does not easily hear the operating noise.

A third aspect of the invention relates to a control unit for a variable valve timing mechanism that changes opening/closing timing of at least one of an intake valve and an exhaust valve of an internal combustion engine by a change amount that corresponds to an operation amount of an actuator. The control unit includes a temperature determination unit and a phase restriction unit. The variable valve timing mechanism is configured in such a manner that a control range, in which the opening/closing timing is allowed to be controlled by the variable valve timing mechanism, includes a first region and a second region, and a ratio of the change amount of the opening/closing timing with respect to the operation amount of the actuator is higher when the opening/closing timing is within the first region than when the opening/closing timing is within the second region. The temperature determination unit determines whether a temperature of the internal combustion engine is equal to or lower than a predetermined reference temperature. The phase restriction unit restricts a range, in which the opening/closing timing is changed by the variable valve timing mechanism, within the first region, when it is determined that the temperature of the internal combustion engine is equal to or lower than the predetermined reference temperature while the internal combustion engine is idling.

A fourth aspect of the invention relates to a control method for the variable valve timing mechanism in the third aspect of the invention. According to the control method, whether a temperature of the internal combustion engine is equal to or lower than a predetermined reference temperature is determined. When it is determined that the temperature of the internal combustion engine is equal to or lower than the predetermined reference temperature while the internal combustion engine is idling, a range, in which the opening/closing timing is changed by the variable valve timing mechanism, is restricted within the first region.

With the control unit and the control method described above, when the internal combustion engine is cold, it is possible to restrict the range, in which the valve phase is allowed to change when the internal combustion engine is idling, within the region (first region) where the speed reduction ratio is high and the valve timing can be maintained without accurately controlling the operation of the actuator, in consideration of the fact that there is a possibility that the valve phase cannot be changed by a sufficient amount by the variable valve timing mechanism due to an increase in friction when the internal combustion engine is cold. As a result, when the internal combustion engine, which has been idling, is brought to a standstill while the internal combustion engine is cold, it is possible to reliably place the valve phase within the first region when the engine stops. Therefore, it is possible to suppress a deviation of the actual valve phase from the phase used in the control, which is likely to occur when the engine is stopped.

In the first and third aspects of the invention described above, the control unit may further include an actuator control unit that controls the operation amount of the actuator based on a deviation of a current value of the opening/closing timing from a target value of the opening/closing timing. In addition, the phase restriction unit may include a target phase setting unit that sets the target value of the opening/closing timing to a value within the first region, when the range, in which the opening/closing timing is changed by the variable valve timing mechanism, is restricted within the first region while the internal combustion engine is idling.

With this configuration, it is possible to easily restrict the range, in which the valve phase is allowed to change when the internal combustion engine is idling, within the first region by setting the target value of the valve phase to a value within the restricted region.

In addition, the target phase setting unit may set the target value of the opening/closing timing to a value within the second region, in the case where the range, in which the opening/closing timing is changed by the variable valve timing mechanism, need not be restricted within the first region.

With this configuration, when the valve phase, which is suitable for enhancement of the efficiency of combustion that takes place in the internal combustion engine when it is idling, is outside the first region, if the target idle speed is equal to or higher than the predetermined rotational speed and it is less likely for the vehicle occupant to hear the operating noise of the variable valve timing mechanism, the valve phase is controlled with higher priority given to enhancement of the combustion efficiency.

The internal combustion engine may be mounted in a vehicle that travels in a cruise mode which is selected from among cruise modes including a first cruise mode in which the vehicle travels using drive power generated by the internal combustion engine and a second cruise mode in which the internal combustion engine is stopped and the vehicle travels using drive power generated by a drive power source that differs from the internal combustion engine.

With this configuration, the valve phase is appropriately controlled when the internal combustion engine is idling, using the variable valve timing mechanism that is mounted in the hybrid vehicle provided with the internal combustion engine and the drive power source other than the internal combustion engine.

In addition, the first region may be closer to a most retarded phase than the second region is. With this configuration, in the hybrid vehicle in which the internal combustion engine is intermittently operated frequently, the valve phase on the retardation side, which is set for a pressure reduction control that is executed when the engine is started, namely, the valve phase target value when the engine is stopped, is set to a value within the region in which the speed reduction ratio is high.

In any one of the fast to fourth aspects of the invention, the actuator may be formed of an electric motor; and the operation amount of the actuator may be a rotational speed of the electric motor relative to a rotational speed of a camshaft that drives the valve of which the opening/closing timing is changed.

With this configuration, when the actuator is formed of an electric motor and the operation amount of the actuator is the rotational speed of the electric motor relative to the rotational speed of the camshaft that stops in response to a stop of the internal combustion engine, the valve phase is appropriately controlled when the internal combustion engine is idling.

With the aspects of the invention described above, it is possible to appropriately control the valve phase when the internal combustion engine is idling, using the variable valve timing mechanism that is configured in such a manner that the ratio of the change amount of a valve phase with respect to the operation amount of the actuator (speed reduction ratio) changes based on the valve phase.

BRIEF DESCRIPTION OF THE DRAWINGS

The foregoing and further features and advantages of the invention will become apparent from the following description of an embodiment with reference to the accompanying drawings, wherein the same or corresponding elements will be denoted by the same reference numerals and wherein:

FIG. 18 is a flowchart for setting the target phase for the intake valve, which is used when the engine is idling, using a software process executed by an ECU according to the modified example of the embodiment of the invention.

DETAILED DESCRIPTION OF THE EMBODIMENT

Figure 1:
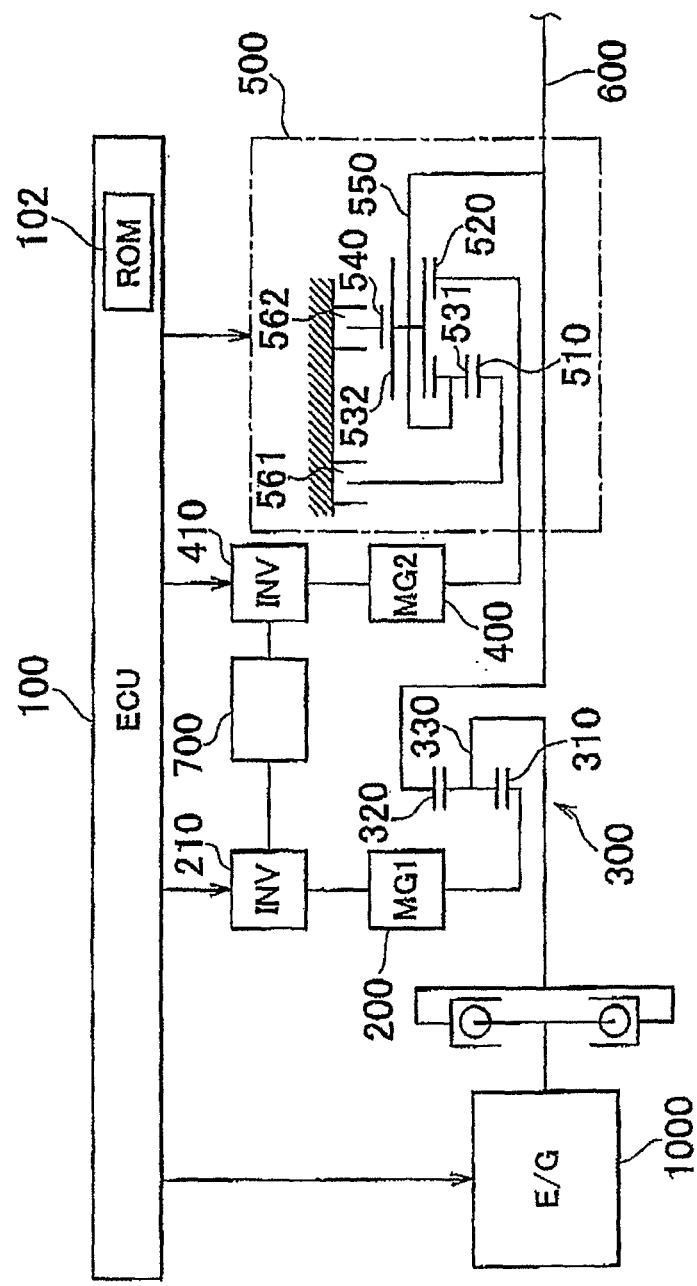
FIG. 1 is a view schematically showing the structure of a power train of a hybrid vehicle.

Hereafter, an embodiment of the invention will be described with reference to the accompanying drawings. In the following description, the same or corresponding elements will be denoted by the same reference numerals, and the descriptions concerning the elements having the same reference numerals will be provided only once below.

A power train of a hybrid vehicle provided with a control unit according to an embodiment of the invention will be described with reference to FIG. 1. The control unit according to the embodiment of the invention is implemented when an ECU (Electronic Control Unit) 100 executes a program stored in a ROM (Read Only Memory) 102 of the ECU 100. The ECU 100 may be divided into multiple ECUs. The program that is executed by the ECU 100 may be recorded in a CD (Compact Disc) or a DVD (Digital Versatile Disc), and distributed to the market.

As shown in FIG. 1, the power train is formed mainly of an engine 1000, a first MG (Motor Generator) 200, a power split mechanism 300, a second MG 400, and a transmission 500. The power split mechanism 300 is provided between the engine 1000 and the first MG 200. The power split mechanism 300 combines the torque from the engine 1000 with the torque from the first MG 200, or splits the torque from the engine 1000 into the torque that is transferred to the first MG 200 and the torque that is transferred to drive wheels.

The engine 1000 is a known power unit that burns fuel to generate drive power. The operating state of the engine 1000 such as the throttle valve opening amount (intake air amount), the fuel supply amount, and the ignition timing is controlled electrically. The control is executed by the ECU 100 that is formed mainly of a microcomputer. The engine 1000 will be described later in detail.

The first MG 200 is, for example, a three-phase alternating current rotary electric machine, and is structured to function as an electric motor (motor) and function also as a generator. The first MG 200 is connected to a storage unit 700, for example, a battery, via an inverter 210. The output torque from the first MG 200 or the regenerative torque is appropriately adjusted by controlling the inverter 210. The inverter 210 is controlled by the ECU 100. A stator (not shown) of the first MG 200 is locked so as not to rotate.

The power split mechanism 300 is a known gear mechanism that produces a differential effect by using three rotational elements, that is, a sun gear (S) 310 which is an external gear, a ring gear (R) 320 which is an internal gear arranged coaxially with the sun gear (S) 310, and a carrier (C) 330 that supports pinions which are in mesh with the sun gear (S) 310 and the ring gear (R) 320 in such a manner that the pinions are allowed to rotate about their axes and turn around the sun gear (S) 310. An output shaft of the engine 1000 is connected to the carrier (C) 330, which is a first rotational element, via a damper. In other words, the carrier (C) 330 serves as an input element.

A rotor (not shown) of the first MG 200 is connected to the sun gear (S) 310, which is a second rotational element. Therefore, the sun gear (S) 310 serves as a so-called reaction force element, and the ring gear (R) 320, which is a third rotational element, serves as an output element. The ring gear (R) 320 is connected to an output shaft 600 that is connected to the drive wheels (not shown).

Figure 2:
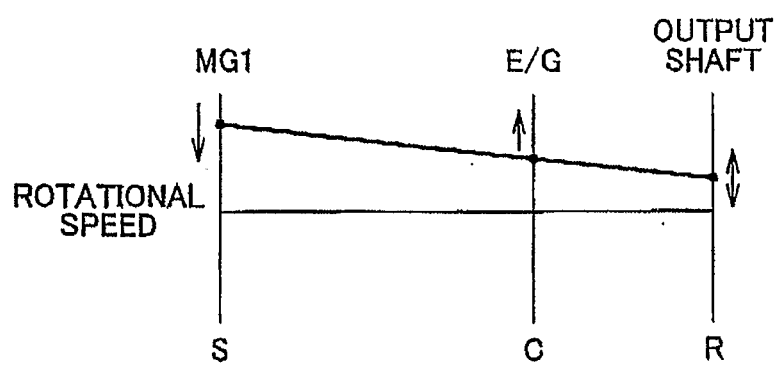
FIG. 2 is a collinear diagram for a power split mechanism.

FIG. 2 is a collinear diagram for the power split mechanism 300. As shown in FIG. 2, when the torque from the first MG 200 is input in the sun gear (S) 310 as the reaction torque for the torque which is output from the engine 1000 and input in the carrier (C) 330, the ring gear (R) 320, which serves as an output element, outputs a torque that is obtained by increasing or decreasing the torque output from the engine 1000 using the reaction torque. In this case, the rotor of the first MG 200 is rotated by this torque, and the first MG 200 serves as a generator. If the rotational speed (output rotational speed) of the ring gear (R) 320 is constant, the rotational speed of the engine 1000 may be continuously (steplessly) changed by adjusting the rotational speed of the first MG 200. That is, a control for setting the rotational speed of the engine 1000 to, for example, a value, at which the optimum fuel efficiency is achieved, is executed by controlling the first MG 200. The ECU 100 executes the control.

When the engine 1000 is stopped while the vehicle is traveling, the first MG 200 is rotating in the reverse direction. In this state, if the first MG 200 is used as an electric motor to produce a torque that is applied in the forward rotational direction, a torque, which is applied in such a direction that the engine 1000 is rotated in the forward direction, is applied to the engine 1000 that is connected to the carrier (C) 330. Thus, the engine 1000 is started by the first MG 200 (motoring or cranking). In this case, a torque, which is applied in such a direction that the rotation of the output shaft 600 is stopped, is applied to the output shaft 600. Therefore, the drive torque used to allow the vehicle to travel is maintained by controlling the torque that is output from the second MG 400, and, at the same time, the engine 1000 is started smoothly. This type of hybrid drive system is called a mechanical split type hybrid system or a split type hybrid system.

Referring again to FIG. 1, the second MG 400 is, for example, a three-phase alternating current rotary electric machine, and is structured to function as an electric motor and function also as a generator. The second MG 400 is connected to the storage unit 700, for example, a battery, via an inverter 410. The torque that is obtained by the powering operation and the torque that is obtained by the regenerative operation are adjusted by controlling the inverter 410. A stator (not shown) of the second MG 400 is locked so as not to rotate.

The transmission 500 is formed of a set of Ravigneaux planetary gear mechanism. The transmission 500 includes a first sun gear (S1) 510 and a second sun gear (S2) 520, which are external gears. First pinions 531 are in mesh with the first sun gear (S1) 510, the first pinions 531 are in mesh with second pinions 532, and the second pinions 532 are in mesh with a ring gear (R) 540 that is arranged coaxially with the sun gears 510 and 520.

The pinions 531 and 532 are supported by a carrier (C) 550 in such a manner that the pinions 531 and 532 are allowed to rotate about their axes and turn around the sun gears 510 and 520. The second sun gear (S2) 520 is in mesh with the second pinions 532. Therefore, the first sun gear (S1) 510 and the ring gear (R) 540 together with the pinions 531 and 532 constitute a mechanism that corresponds to a double-pinion planetary gear mechanism. The second sun gear (S2) 520 and the ring gear (R) 540 together with the second pinions 532 constitute a mechanism that corresponds to a single-pinion planetary gear mechanism.

The transmission 500 further includes a B1 brake 561 that selectively locks the first sun gear (S1) 510, and a B2 brake 562 that selectively locks the ring gear (R) 540. These brakes 561 and 562 are so-called friction engaging elements that generate engagement force using frictional force. Multi-disc engaging devices or band-type engaging devices may be used as the brakes 561 and 562. Each of the brakes 561 and 562 is structured so that the torque capacity thereof is continuously changes based on the engaging force that is hydraulically generated. In addition, the second MG 400 is connected to the second sun gear (S2) 520. The carrier (C) 550 is connected to the output shaft 600.

Therefore, in the transmission 500, the second sun gear (S2) 520 serves as a so-called input element, and the carrier (C) 550 serves as an output element. When the B1 brake 561 is engaged, a high gear, of which the gear ratio is higher than "1", is selected. When the B2 brake 562 is engaged instead of the B1 brake 561, a low gear, of which the gear ratio is higher than the gear ratio of the high gear, is selected.

The transmission 500 is shifted between these gears based on the vehicle drive state such as a vehicle speed and a required drive power (or an accelerator pedal operation amount). More specifically, shift ranges are set in advance in the form of a map (shift diagram), and a control is executed to select one of the gears based on the detected vehicle drive state.

Figure 3:
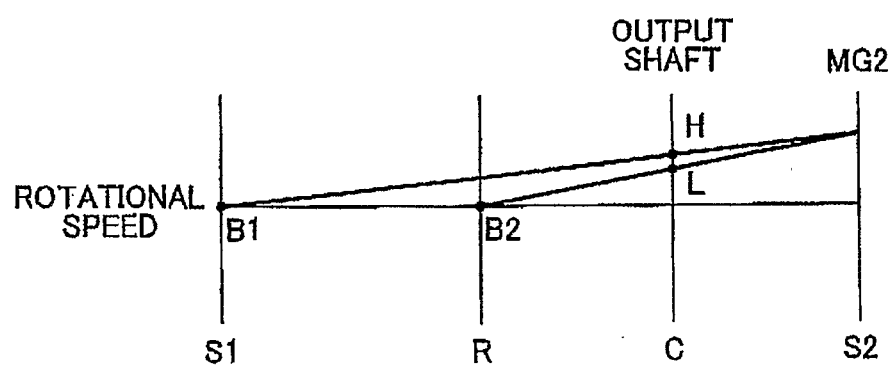
FIG. 3 is a collinear diagram for a transmission.

FIG. 3 is a collinear diagram for the transmission 500. As shown in FIG. 3, when the ring gear (R) 540 is locked by the B2 brake 562, a low gear L is selected, and the torque output from the second MG 400 is amplified based on the gear ratio, and the amplified torque is applied to the output shaft 600. When the first sun gear (S1) 510 is locked by the B1 brake 561, a high gear H, of which the gear ratio is lower than that of the low gear L, is selected. The gear ratio of the high gear H is also higher than "1". Therefore, the torque output from the second MG 400 is amplified based on the gear ratio, and the amplified torque is applied to the output shaft 600.

When the low gear L or the high gear H is maintained, the torque that is obtained by amplifying the torque output from the second MG 400 based on the gear ratio is applied to the output shaft 600. However, when the gears are being shifted, the torque, which is influenced by the torque capacities of the brakes 561 and 562 and the inertia torque due to a change in the rotational speed, is applied to the output shaft 600. The torque that is applied to the output shaft 600 is a positive torque when the second MG 400 is in the drive state, and is a negative torque when the second MG 400 is in the driven state.

In the embodiment of the invention, the hybrid vehicle travels in one of a first cruise mode in which the hybrid vehicle travels using only the drive power generated by the engine 1000, a second cruise mode in which the engine 1000 is stopped and the hybrid vehicle travels using only the drive power generated by the second MG 400, and a third cruise mode in which the hybrid vehicle travels using both the drive power generated by the engine 1000 and the drive power generated by the second MG 400. The cruise mode is selected based on various parameters such as the accelerator pedal operation amount, and the remaining capacity of the storage unit 700.

A technology known in the technical field that pertains to hybrid vehicles may be used to form a method for selecting the cruise mode. Therefore, the detailed description on the method for selecting the cruise mode will not be provided below. In addition, the number of cruise modes is not limited to three.

The engine 1000 will be described in further detail with reference to FIG. 4. The engine 1000 is an eight-cylinder V-type engine including an "A" bank 1010 and a "B" bank 1012 each of which has four cylinders therein. Note that, engines other than an eight-cylinder V-type engine may be used.

Air that has passed through an air cleaner 1020 is supplied to the engine 1000. A throttle valve 1030 adjusts the amount of air supplied to the engine 1000. The throttle valve 1030 is an electronically-controlled throttle valve that is driven by a motor.

The air is introduced into a cylinder 1040 through an intake passage 1032. The air is then mixed with fuel in the cylinder 1040 (combustion chamber). The fuel is injected from an injector 1050 directly into the cylinder 1040. Namely, the injection hole of the injector 1050 is positioned within the cylinder 1040.

The fuel is injected into the cylinder 1040 in the intake stroke. The time at which the fuel is injected need not be in the intake stroke. The description concerning the embodiment of the invention will be provided on the assumption that the engine 1000 is a direct-injection engine where the injection hole of the injector 1050 is positioned within the cylinder 1040. In addition to the injector 1050 for direct-injection, an injector for port-injection may be provided. Alternatively, only an injector for port-injection may be provided.

The air-fuel mixture in the cylinder 1040 is ignited by a spark plug 1060, and then burned. The burned air-fuel mixture, namely, the exhaust gas, is purified by a three-way catalyst 1070, and then discharged to the outside of the vehicle. A piston 1080 is pushed down due to combustion of the air-fuel mixture, whereby a crankshaft 1090 is rotated.

An intake valve 1100 and an exhaust valve 1110 are provided on the top of the cylinder 1040. The intake valve 1100 is driven by an intake camshaft 1120, and the exhaust valve 1110 is driven by an exhaust camshaft 1130. The intake camshaft 1120 and the exhaust camshaft 1130 are connected to each other by, for example, a chain or a gear, and rotate at the same rotational speed. Because the number of revolutions (typically, the number of revolutions per minute (rpm)) of a rotating body, for example, a shaft is usually referred to as the rotational speed, the term "rotational speed" will be used in the following description.

The phase (opening/closing timing) of the intake valve 1100 is controlled by an intake VVT mechanism 2000 which is fitted to the intake camshaft 1120. The phase (opening/closing timing) of the exhaust valve 1110 is controlled by an exhaust VVT mechanism 3000 which is fitted to the exhaust camshaft 1130.

In the embodiment of the invention, the intake camshaft 1120 and the exhaust camshaft 1130 are rotated by the VVT mechanisms 2000 and 3000, respectively, whereby the phase of the intake valve 1100 and the phase of the exhaust valve 1110 are controlled. However, the method for controlling the phase of the intake valve 1100 is not limited to this.

Figure 4:
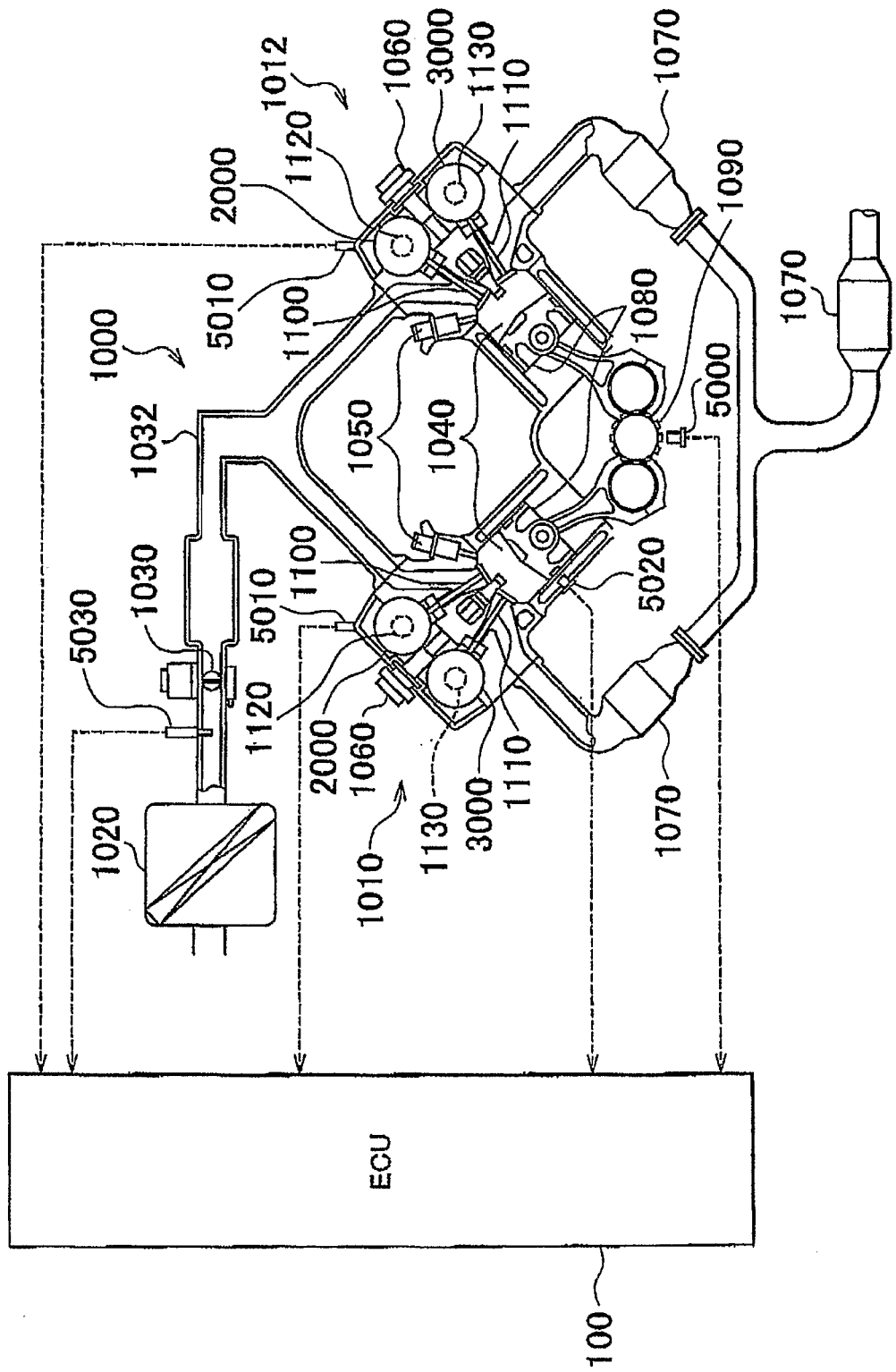
FIG. 4 is a view schematically showing the structure of an engine of the hybrid vehicle.

The intake VVT mechanism 2000 is operated by an electric motor 2060 (not shown in FIG. 4). The electric motor 2060 is controlled by the ECU 100. The magnitude of electric current passing through the electric motor 2060 is detected by an ammeter (not shown) and the voltage applied to the electric motor 2060 is detected by a voltmeter (not shown), and a signal indicating the magnitude of electric current and a signal indicating the voltage are transmitted to the ECU 100.

The exhaust VVT mechanism 3000 is hydraulically operated. Note that, the intake VVT mechanism 2000 may be hydraulically operated. Note that, the exhaust VVT mechanism 3000 may be operated by means of an electric motor.

The ECU 100 receives signals indicating the rotational speed and the crank angle of the crankshaft 1090 from a crank angle sensor 5000. The ECU 100 also receives a signal indicating the phase of the intake camshaft 1120 and a signal indicating the phase of the exhaust camshaft 1130 (the positions of these camshafts in the rotational direction), from a camshaft position sensor 5010. In other words, the ECU 100 receives a signal indicating the phase of the intake valve 1100 and a signal indicating the phase of the exhaust valve 1110 from the cam position sensor 5010. In addition, the ECU 100 receives a signal indicating the rotational speed of the intake cam shaft 1120 and a signal indicating the rotational speed of the exhaust camshaft 1130 from the cam position sensor 5010.

In addition, the ECU 100 receives a signal indicating the temperature of a coolant for the engine 1000 (the coolant temperature) from a coolant temperature sensor 5020, and a signal indicating the amount of air taken in the engine 1000 from an airflow meter 5030.

Further, the ECU 100 receives a signal indicating the rotational speed of an output shaft of the electric motor 2060 from a rotational speed sensor 5040.

The ECU 100 controls the throttle valve opening amount, the ignition timing, the fuel injection timing, the fuel injection amount, the phase of the intake valve 1100, the phase of the exhaust valve 1110, etc. based on the signals received from the above-mentioned sensors and the maps and programs that are stored in a memory (not shown) so that the engine 1000 is placed in the desired operating state.

Figure 5:
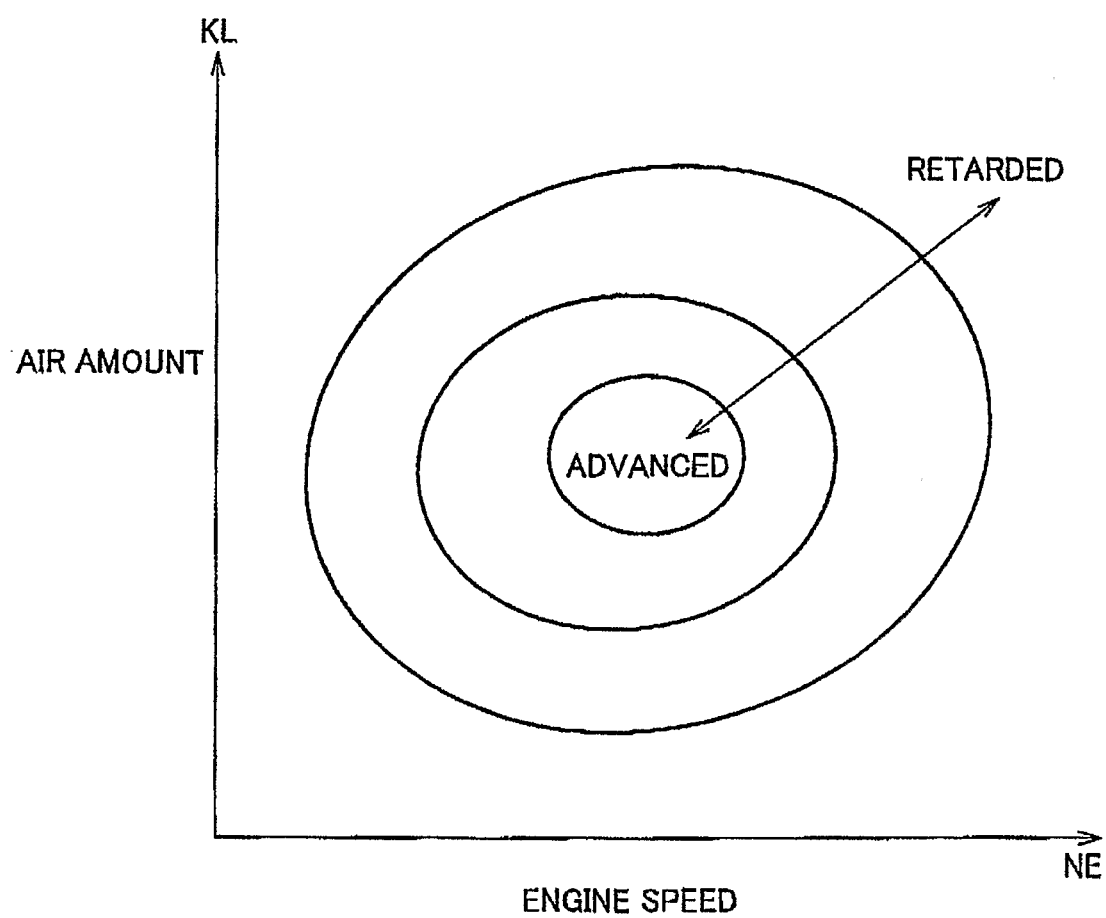
FIG. 5 is a graph showing a map that defines the phase of an intake valve.

According to the embodiment of the invention, the ECU 100 sets the phase of the intake valve 1100 based on the map that uses an engine speed NE and an intake air amount KL as parameters, as shown in FIG. 5. Multiple maps, used to set the phase of the intake valve 1100 at multiple coolant temperatures, are stored in the memory.

Hereafter, the intake VVT mechanism 2000 will be described in more detail. Note that, the exhaust VVT mechanism 3000 may have the same structure as the intake VVT mechanism 2000 described below.

Figure 6:
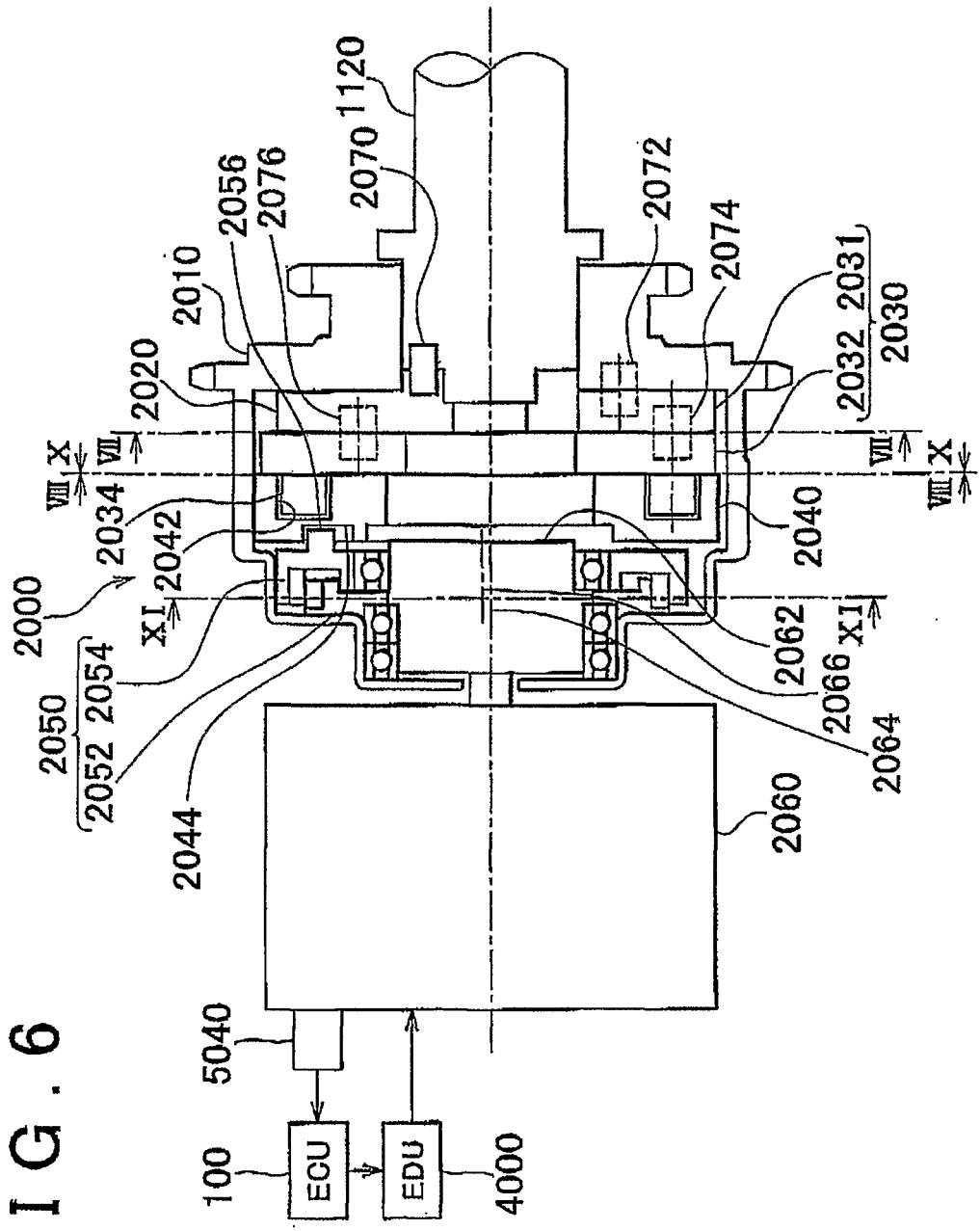
FIG. 6 is a cross-sectional view showing an intake VVT mechanism.

As shown in FIG. 6, the intake VVT mechanism 2000 includes a sprocket 2010, a cam plate 2020, link mechanisms 2030, a guide plate 2040, a speed reducer 2050, and the electric motor 2060.

The sprocket 2010 is connected to the crankshaft 1090 via, for example, a chain. The rotational speed of the sprocket 2010 is one-half the rotational speed of the crankshaft 1090. The intake camshaft 1120 is provided in such a manner that the intake camshaft 1120 is coaxial with the rotational axis of the sprocket 2010 and rotates relative to the sprocket 2010.

The cam plate 2020 is connected to the intake camshaft 1120 with a first pin 2070. In the sprocket 2010, the cam plate 2020 rotates together with the intake camshaft 1120. The cam plate 2020 and the intake camshaft 1120 may be formed integrally with each other.

Figure 7:
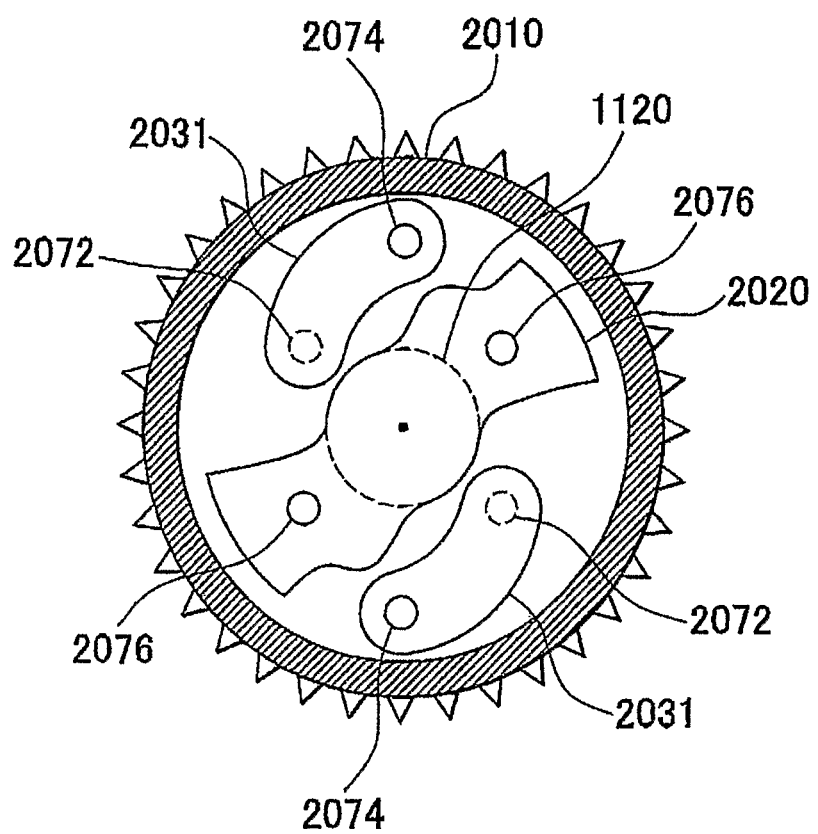
FIG. 7 is a cross-sectional view taken along the line VII-VU in FIG. 6.

Each link mechanism 2030 is formed of a first arm 2031 and a second arm 2032. As shown in FIG. 7, that is, a cross-sectional view taken along the line VII-VII in FIG. 6, paired first arms 2031 are arranged in the sprocket 2010 so as to be symmetric with respect to the rotational axis of the intake camshaft 1120. Each first arm 2031 is connected to the sprocket 2010 so as to pivot about a second pin 2072.

Figure 8:
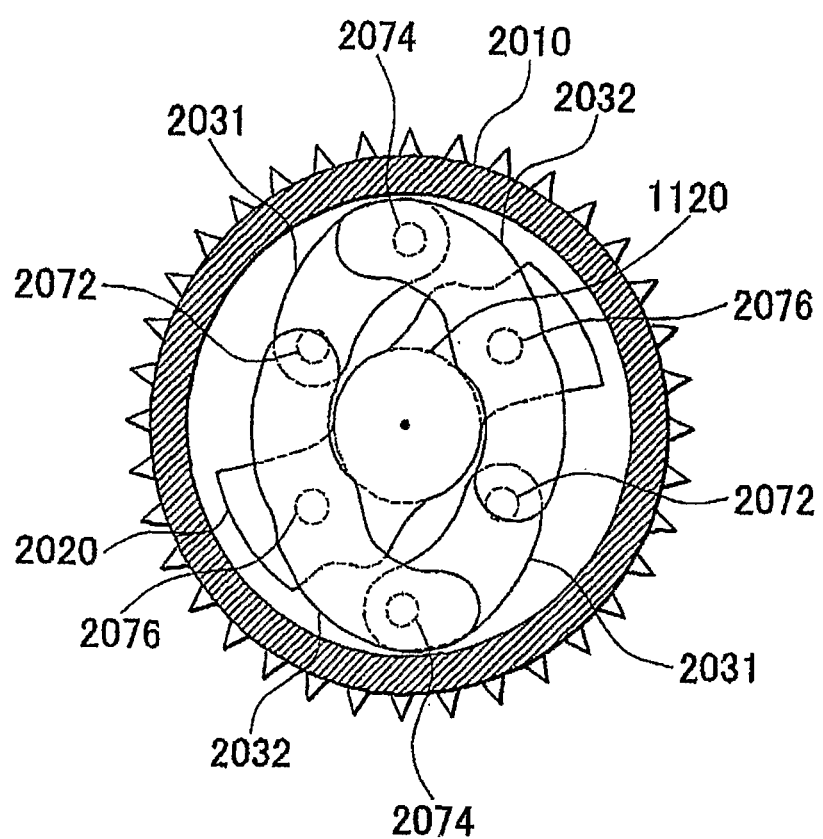
FIG. 8 is a first cross-sectional view taken along the line VIII-VIII in FIG. 6.
Figure 9:
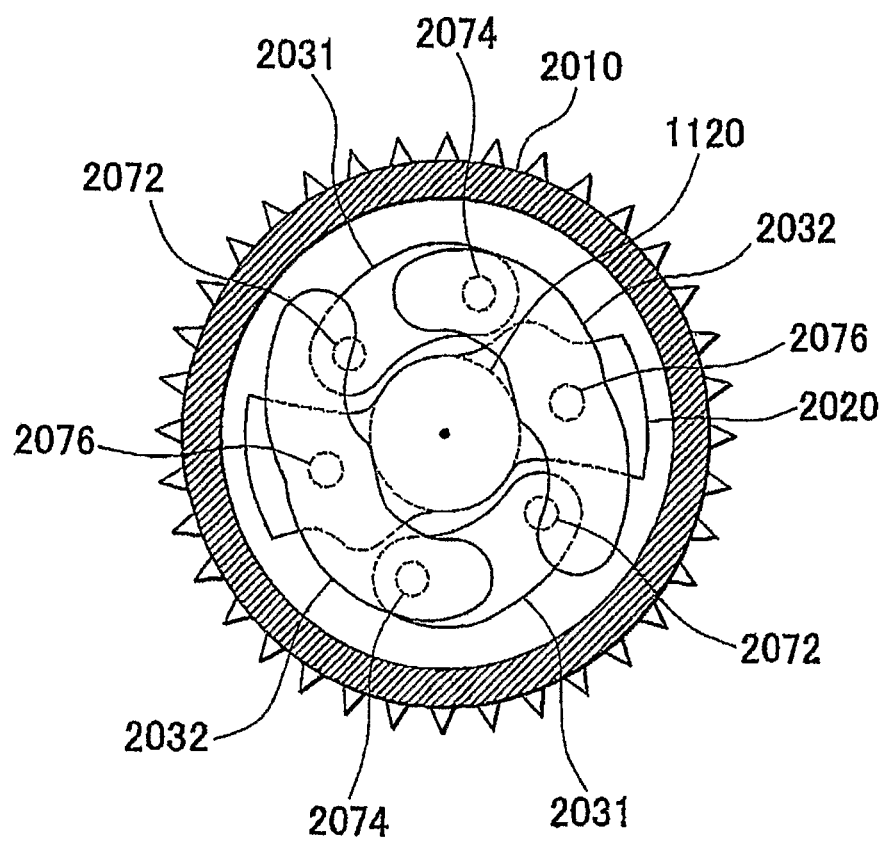
FIG. 9 is a second cross-sectional view taken along the line VIII-VIII in FIG. 6.

As shown in FIG. 8, that is, a cross-sectional view taken along the line VIII-VIII in FIG. 6, and FIG. 9 that shows the state achieved by advancing the phase of the intake valve 1100 from the state shown in FIG. 8, the first arms 2031 and the cam plate 2020 are connected to each other by the second arms 2032.

Each second arm 2032 is supported so as to pivot about a third pin 2074, with respect to the first arm 2031. Each second arm 2032 is supported so as to pivot about a fourth pin 2076, with respect to the cam plate 2020.

The intake camshaft 1120 is rotated relative to the sprocket 2010 by the pair of link mechanisms 2030, whereby the phase of the intake valve 1100 is changed. Accordingly, even if one of the link mechanisms 2030 breaks and snaps, the phase of the intake valve 1100 is changed by the other link mechanism 2030.

Referring again to FIG. 6, a control pin 2034 is fitted on one face of each link mechanism 2030 (more specifically, the second arm 2032), the face being proximal to the guide plate 2040. The control pin 2034 is arranged coaxially with the third pin 2074. Each control pin 2034 slides within a guide groove 2042 formed in the guide plate 2040.

Each control pin 2034 moves in the radial direction while sliding within the guide groove 2042 formed in the guide plate 2040. The movement of each control pin 2034 in the radial direction rotates the intake camshaft 1120 relative to the sprocket 2010.

Figure 10:
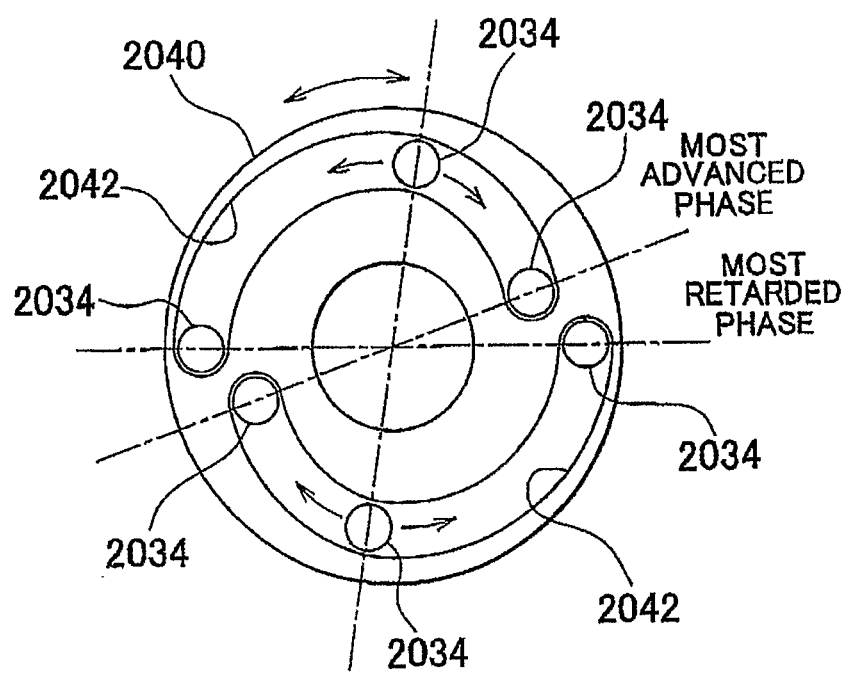
FIG. 10 is a cross-sectional view taken along the line X-X in FIG. 6.

As shown in FIG. 10, that is, a cross-sectional view taken along the line X-X in FIG. 6, the guide groove 2042 is formed in a spiral fashion so that the control pin 2034 moves in the radial direction in accordance with the rotation of the guide plate 2040. However, the shape of the guide groove 2042 is not limited to this.

As the distance between the control pin 2034 and the axis of the guide plate 2040 increases in the radial direction, the phase of the intake valve 1100 is more retarded. Namely, the amount of change in the phase corresponds to the amount by which each link mechanism 2030 is operated in accordance with the movement of the control pin 2034 in the radial direction. Note that, as the distance between the control pin 2034 and the axis of the guide plate 2040 increases in the radial direction, the phase of the intake valve 1100 may be more advanced.

As shown in FIG. 10, when the control pin 2034 reaches the end of the guide groove 2042, the operation of the link mechanism 2030 is restricted. Accordingly, the phase, at which the control pin 2034 reaches the end of the guide groove 2042, is the mechanically determined most advanced phase or the mechanically determined most retarded phase of the intake valve 1100.

Referring again to FIG. 6, multiple recesses 2044 are formed in one face of the guide plate 2040, the face being proximal to the speed reducer 2050. The recesses 2044 are used to connect the guide plate 2040 and the speed reducer 2050 to each other.

The speed reducer 2050 is formed of an external gear 2052 and an internal gear 2054. The external gear 2052 is fixed to the sprocket 2010 so as to rotate together with the sprocket 2010.

Multiple projections 2056, which are fitted in the recesses 2044 of the guide plate 2040, are formed on the internal gear 2054. The internal gear 2054 is supported so as to be rotatable about an eccentric axis 2066 of a coupling 2062 of which the axis deviates from an axis 2064 of the output shaft of the electric motor 2060.

Figure 11:
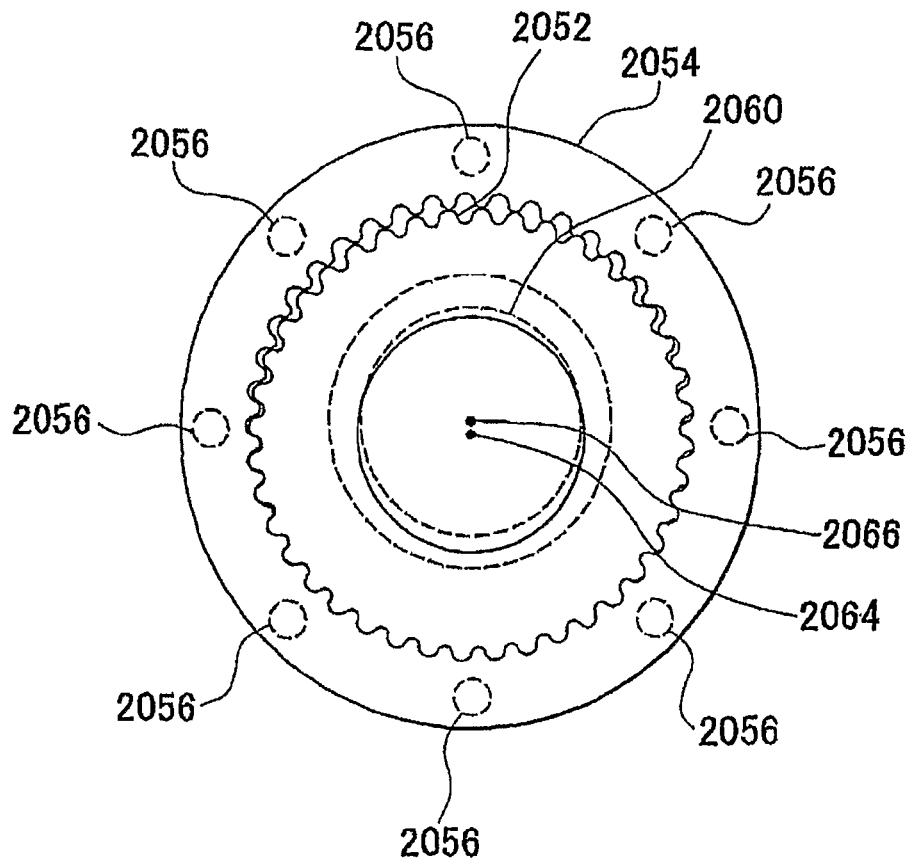
FIG. 11 is a cross-sectional view taken along the line XI-XI in FIG. 6.

FIG. 11 shows a cross-sectional view taken along the line XI-XI in FIG. 6. The internal gear 2054 is arranged in such a manner that part of the multiple teeth thereof mesh with the external gear 2052. When the rotational speed of the output shaft of the electric motor 2060 is equal to the rotational speed of the sprocket 2010, the coupling 2062 and the internal gear 2054 rotate at the same rotational speed as the external gear 2052 (the sprocket 2010). In this case, the guide plate 2040 rotates at the same rotational speed as the sprocket 2010, and the phase of the intake valve 1100 is maintained.

When the coupling 2062 is rotated about the axis 2064 relative to the external gear 2052 by the electric motor 2060, the entirety of the internal gear 2054 turns around the axis 2064, and, at the same time, the internal gear 2054 rotates about the eccentric axis 2066. The rotational movement of the internal gear 2054 causes the guide plate 2040 to rotate relative to the sprocket 2010, whereby the phase of the intake valve 1100 is changed.

The phase of the intake valve 1100 is changed by reducing the relative rotational speed (the operation amount of the electric motor 2060) between the output shaft of the electric motor 2060 and the sprocket 2010 using the speed reducer 2050, the guide plate 2040 and the link mechanisms 2030. Alternatively, the phase of the intake valve 1100 may be changed by increasing the relative rotational speed between the output shaft of the electric motor 2060 and the sprocket 2010.

As described above, with the VVT mechanism 2000 according to the embodiment of the invention, the phase of the intake valve 1100 is changed using the rotational speed of the electric motor 2060 relative to the rotational speed of the sprocket 2010, that is, the difference between the rotational speed of the electric motor 2060 and the rotational speed of the sprocket 2010 (basically, the same as the rotational speed of the intake camshaft 1120) as the operation amount of the actuator.

Figure 12:
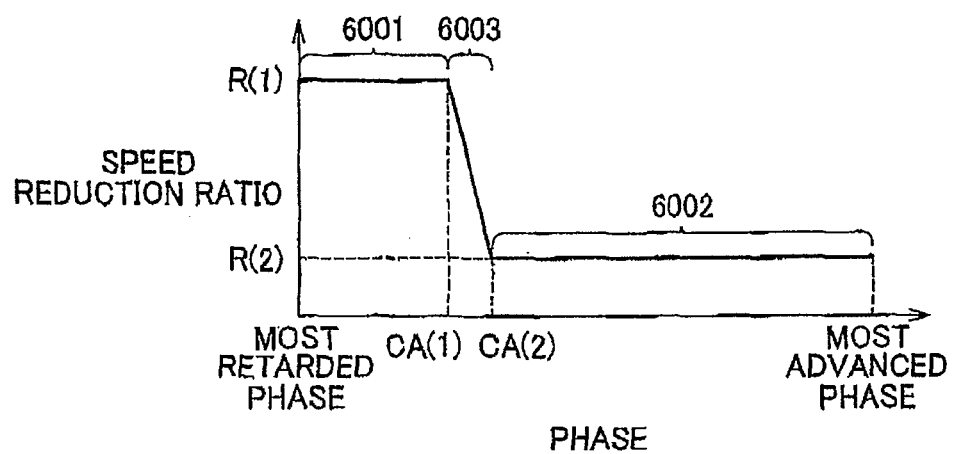
FIG. 12 is a graph showing the speed reduction ratio that elements of the intake VVT mechanism realize in cooperation.

As shown in FIG. 12, the speed reduction ratio that the elements of the intake VVT mechanism 2000 realize in cooperation, namely, the ratio of the relative rotational speed between the output shaft of the electric motor 2060 and the sprocket 2010 to the amount of change in the phase of the intake valve 1100, may take a value corresponding to the phase of the intake valve 1100. According to the embodiment of the invention, as the speed reduction ratio increases, the amount of change in the phase with respect to the relative rotational speed between the output shaft of the electric motor 2060 and the sprocket 2010 decreases.

When the phase of the intake valve 1100 is within the retardation region that extends from the most retarded phase to CA1, the speed reduction ratio that the elements of the intake VVT mechanism 2000 realize in cooperation is R1. When the phase of the intake valve 1100 is within the advance region that extends from CA2 (CA2 is the phase that is more advanced than CA1) to the most advanced phase, the speed reduction ratio that the elements of the intake VVT mechanism 2000 realize in cooperation is R2 (R1>R2).

When the phase of the intake valve 1100 is within the intermediate region that extends from CA1 to CA2, the speed reduction ratio that the elements of the intake VVT mechanism 2000 realize in cooperation changes at a predetermined rate ((R2−R1)/(CA2−CA1)).

The effects of the intake VVT mechanism 2000 of a variable valve timing mechanism will be described below.

Figure 13:
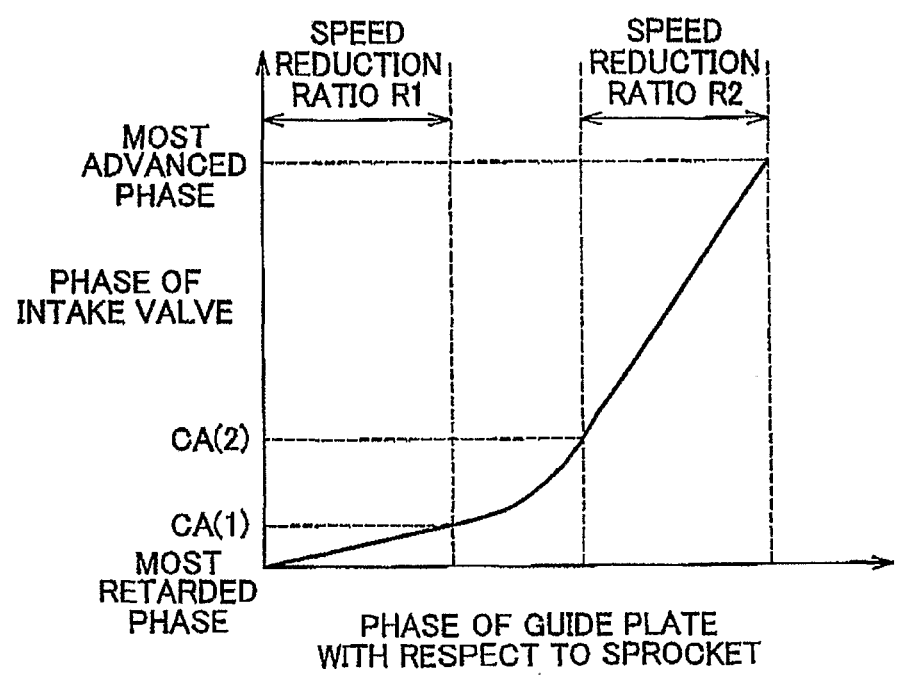
FIG. 13 is a graph showing the relationship between the phase of a guide plate relative to a sprocket and the phase of the intake valve.

When the phase of the intake valve 1100 (the intake camshaft 1120) is advanced, the electric motor 2060 is operated to rotate the guide plate 2040 relative to the sprocket 2010. As a result, the phase of the intake valve 1100 is advanced, as shown in FIG. 13.

When the phase of the intake valve 1100 is within the retardation region that extends from the most retarded phase to CA1, the relative rotational speed between the output shaft of the electric motor 2060 and the sprocket 2010 is reduced at the speed reduction ratio R1. As a result, the phase of the intake valve 1100 is advanced.

When the phase of the intake valve 1100 is within the advance region that extends from CA2 to the most advanced phase, the relative rotational speed between the output shaft of the electric motor 2060 and the sprocket 2010 is reduced at the speed reduction ratio R2. As a result, the phase of the intake valve 1100 is advanced.

When the phase of the intake valve 1100 is retarded, the output shaft of the electric motor 2060 is rotated relative to the sprocket 2010 in the direction opposite to the direction in which the phase of the intake valve 1100 is advanced. When the phase is retarded, the relative rotational speed between the output shaft of the electric motor 2060 and the sprocket 2010 is reduced in the manner similar to that when the phase is advanced. When the phase of the intake valve 1100 is within a retardation region 6001 that extends from the most retarded phase to CA1, the relative rotational speed between the output shaft of the electric motor 2060 and the sprocket 2010 is reduced at the speed reduction ratio R1. As a result, the phase is retarded. When the phase of the intake valve 1100 is within an advance region 6002 that extends from CA2 to the most advanced phase, the relative rotational speed between the output shaft of the electric motor 2060 and the sprocket 2010 is reduced at the speed reduction ratio R2. As a result, the phase is retarded.

Accordingly, as long as the direction of the relative rotation between the output shaft of the electric motor 2060 and the sprocket 2010 remains unchanged, the phase of the intake valve 1100 may be advanced or retarded in both the retardation region 6001 that extends from the most retarded phase to CA1 and the advance region 6002 that extends from the CA2 to the most advanced phase. In this case, in the advance region 6002 that extends from CA2 to the most advanced phase, the phase is advanced or retarded by an amount larger than that in the retardation region that extends from the most retarded phase to CA1. Accordingly, the advance region 6002 is broader in the phase change width than the retardation region 6001.

In the retardation region 6001 that extends from the most retarded phase to CA1, the speed reduction ratio is high. Accordingly, a high torque is required to rotate the output shaft of the electric motor 2060 using the torque applied to the intake camshaft 1120 in accordance with the operation of the engine 1000. Therefore, even when the electric motor 2060 does not produce a torque, for example, even when the electric motor 2060 is stopped, the rotation of the output shaft of the electric motor 2060, which is caused by the torque applied to the intake camshaft 1120, is restricted. This restricts the deviation of the actual phase from the phase used in the control.

Therefore, if the intake valve phase when the engine stops is within the retardation region 6001 in which the speed reduction is high, even when the output shaft of the electric motor 2060 is rotated by a reaction force generated by the intake camshaft 1120 when the engine is stopped, it is possible to prevent an unintentional change in the intake valve phase, that is, a deviation of the actual phase from the phase used in the control. Conversely, in order to prevent such a change in the intake valve phase, it is necessary to reliably place the intake valve phase when the engine stops into the retardation region 6001 in which the speed reduction ratio is high.

Generally, in a hybrid vehicle, the frequency with which the engine is started while the vehicle is traveling is high because the engine 1000 may be operated intermittently while the vehicle is traveling. Therefore, the valve phase when the engine is started, namely, the target phase that is used when the engine is stopped, is set to the most retarded phase in order to execute a start-time pressure-reducing control (so-called decompression control) for reducing shock that is likely to be caused when the engine is being started. Therefore, it is preferable to set the speed reduction ratio that is used in the retardation region 6001 to a high value.

When the phase of the intake valve 1100 is within an intermediate region 6003 that extends from CA1 to CA2, the relative rotational speed between the output shaft of the electric motor 2060 and the sprocket 2010 is reduced at the speed reduction ratio that changes at a predetermined rate. As a result, the phase of the intake valve 1100 is advanced or retarded.

When the phase of the intake valve 1100 is shifted from the retardation region to the advance region, or from the advance region to the retardation region, the amount of change in the phase with respect to the relative rotational speed between the output shaft of the electric motor 2060 and the sprocket 2010 is gradually increased or reduced. Accordingly, an abrupt stepwise change in the amount of change in the phase is restricted to restrict an abrupt change in the phase. As a result, the phase of the intake valve 1100 is controlled more appropriately.

In the retardation region 6001 in which the speed reduction ratio is relatively high, it is more difficult to transfer the rotational force from the output shaft of the electric motor 2060 and the sprocket 2010 to the inside of the intake VVT mechanism 2000, than in the advance region 6002 in which the speed reduction ratio is relatively low. Accordingly, when the phase of the intake valve 1100 is within the retardation region 6001, the operation speed of each mechanism in the VVT mechanism 2000 is relatively low. Therefore, in the retardation region 6001, the operating noise of the VVT mechanism 2000 is suppressed to a level lower than that in the advance region 6002 and the intermediate region 6003.

Figure 14:
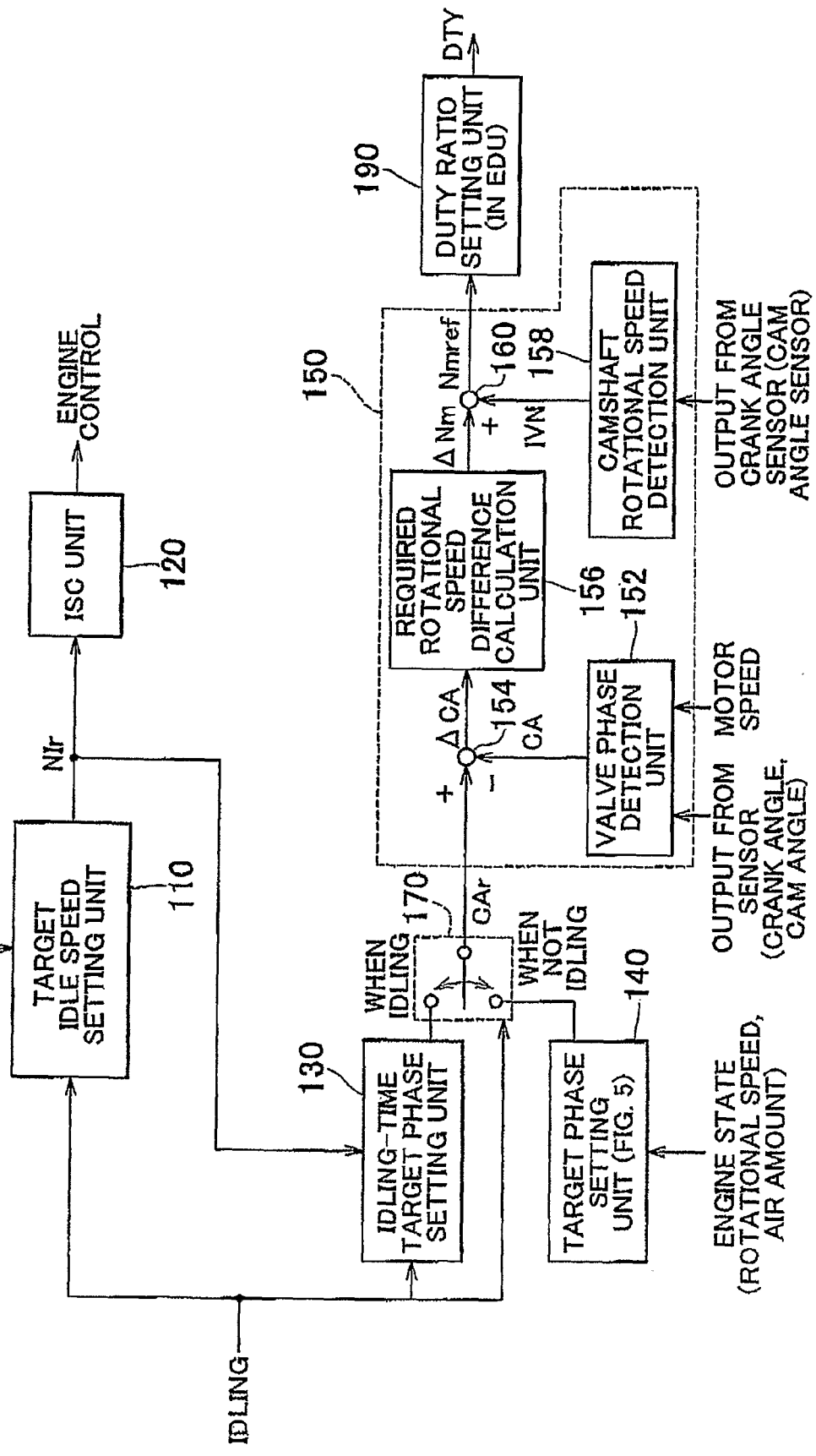
FIG. 14 is a block diagram illustrating the configuration of a control executed over a variable valve timing mechanism according to an embodiment of the invention.

FIG. 14 is a block diagram illustrating the configuration of a control executed over the variable valve timing mechanism according to the embodiment of the invention. Each block shown in FIG. 14 is implemented by the ECU 100 using either hardware or software.

As shown in FIG. 14, a valve phase control unit 150 sets a rotational speed command value Nmref for the electric motor 2060, which serves as an actuator, based on a deviation $\Delta CA$ of an actual valve phase CA from a target phase CAr for the intake valve 1100.

The valve phase control unit 150 includes a valve phase detection unit 152, calculation units 154 and 160, a required rotational speed difference calculation unit 156, and a camshaft rotational speed detection unit 158.

The valve phase detection unit 152 calculates the current valve phase CA of the intake valve 1100 based on signals from the crank angle sensor 5000 and the cam position sensor 5010 (crank angle signal and cam angle signal) or the motor speed detected by the rotational speed sensor 5040 for the electric motor 2060.

The valve phase detection unit 152 detects the current valve phase CA based on the crank angle signal and the cam angle signal from the sensors described above by, for example, converting a time lag between issuance of the cam angle signal and issuance of the crank angle signal into the rotational phase difference between the crankshaft 1090 and the intake camshaft 1120.

Alternatively, with the intake VVT mechanism 2000 according to the embodiment of the invention, a valve phase change amount $\Delta\theta$ within a time $\Delta T$ can be traced based on the operation amount (rotational speed difference $\Delta Nm$) of the electric motor 2060, which serves as an actuator, according to Equation 1. In Equation 1, $R(\theta)$ denotes the speed reduction ratio, shown in FIG. 12, which changes in accordance with the intake valve phase.

$$\Delta\theta \propto \Delta Nm \times 360° \times (1/R(\theta)) \times \Delta T \quad (1)$$

Therefore, the valve phase detection unit 152 is able to detect the current valve phase CA by integrating the phase change amounts $\Delta\theta$ calculated according to Equation 1.

The calculation unit 154 calculates the phase deviation $\Delta CA$ of the current valve phase CA detected by the valve phase detection unit 152 from the target phase CAr.

The required rotational speed difference calculation unit 156 calculates the rotational speed difference $\Delta Nm$ between the rotational speed of the output shaft of the electric motor 2060 and the rotational speed of the sprocket 2010 (intake camshaft 1120), which is used to make the actual valve phase closer to the target phase CAr, based on the phase deviation $\Delta CA$ calculated by the calculation unit 154. For example, the rotational speed difference $\Delta Nm$ is set to a positive value ($\Delta Nm > 0$) when the intake valve phase is advanced, whereas it is set to a negative value ($\Delta Nm < 0$) when the intake valve phase is retarded. When the current intake valve phase is maintained (namely when $\Delta\theta = 0$), the rotational speed difference $\Delta Nm$ is set to a value substantially equal to zero ($\Delta Nm = 0.0$).

The camshaft rotational speed detection unit 158 calculates the rotational speed of the sprocket 2010, that is, an actual rotational speed IVN of the intake camshaft 1120 by dividing the rotational speed of the crankshaft 1090 by two.

The calculation unit 160 calculates the rotational speed command value Nmref for the electric motor 2060 by adding the actual rotational speed IVN of the intake camshaft 1120, which is detected by the camshaft rotational speed detection unit 158, and the rotational speed difference $\Delta Nm$, which is set by the required rotational speed difference calculation unit 156, together. A signal indicating the rotational speed command value Nmref is transmitted to an EDU 4000.

The EDU 4000 executes a rotational speed control for operating the electric motor 2060 according to the rotational speed command value Nmref. For example, the EDU 4000 includes a duty ratio setting unit 190 that sets a duty ratio DTY based on the rotational speed command value Nmref. The duty ratio setting unit 190 receives a signal indicating a rotational speed Nmt of the electric motor 2060 that is detected by the rotational speed sensor 5040. The duty ratio setting unit 190 controls the duty ratio DTY based on the motor speed Nmt and the rotational speed command value Nmref so that the motor speed Nmt matches the rotational speed command value Nmref.

The duty ratio DTY indicates the ratio of the duration in which a switching element (not shown) of the EDU 4000 is on to a switching cycle. The electric power that is supplied to the electric motor 2060 is controlled by operating the switching element based on the duty ratio DTY. For example, if the operating voltage of the electric motor 2060 is set to a voltage that corresponds to the duty ratio DTY, the operating voltage increases and the torque that is generated by the electric motor 2060 increases as the duty ratio DTY is set to a higher value. In other words, the operating voltage of the electric motor 2060 decreases and the torque that is generated by the electric motor 2060 deceases as the duty ratio is set to a lower value.

Instead of setting the duty ratio DTY, the operating voltage or the operating current of the electric motor 2060 may be directly set by the EDU 4000 based on the motor speed Nmt and the rotational speed command value Nmref. In this case, the rotational speed control may be executed by driving the electric motor 2060 at the set operating voltage or with the set operating current.

Next, the manner in which the target phase CAr for the intake valve 1100, which is controlled by the VVT mechanism, will be described.

The target phase CAr is set by an idling-time target phase setting unit 130 when the engine 1000 is idling, and set by a target phase setting unit 140 when the engine 1000 is not idling. When the engine 1000 is idling, a switching unit 170 transmits a signal indicating the target phase CAr set by the idling-time target phase setting unit 130 to the valve phase control unit 150. On the other hand, when the engine 1000 is not idling, the switching unit 170 transmits a signal indicating the target phase CAr set by the target phase setting unit 140 to the valve phase control unit 150.

The target phase setting unit 140 sets the target phase CAr for the intake valve 1100 based on the state of the engine 1000, for example, based on the engine speed NE and the air amount KL, according to a map shown in FIG. 5.

The idling-time target phase setting unit 130 variably sets the target phase based on a target rotational speed (target idle speed) NIr for the engine 1000, which is used when the engine 1000 is idling and which is set by a target idle speed setting unit 110.

The target idle speed setting unit 110 sets the target idle speed NIr based on the vehicle state when it is determined that the amount, by which a driver depresses the accelerator pedal, becomes zero and the engine 1000 is idling.

For example, the target idle speed setting unit 110 variably sets the target idle speed NIr based on the shift position and shift range selected by the driver. More specifically, when the shift position or the shift range that allows the vehicle to travel (typically, D-range or R-range) is selected, the target idle speed NIr is set to a relatively high value (e.g. approximately 1000 rpm) to prepare for a vehicle cruise. On the other hand, when the shift position or the shift range that allows the vehicle to start traveling immediately (typically, P-range or N-range) is not selected, the target idle speed NIr is set to a relatively low value (e.g. approximately 850 rpm) to enhance the fuel efficiency.

An ISC (Idle Speed Control) unit 120 controls the engine 1000 so that the engine speed matches the target idle speed NIr that is set by the target idle speed setting unit 110. Typically, the ISC unit 120 controls the amount of air taken in the engine 1000. The intake air amount is controlled by controlling the opening amount of the throttle valve 1030, or controlling the lift amount when the intake valve 1100 is provided with a lift amount changing mechanism. Alternatively, when the engine 1000 is, for example, a diesel engine, the idle speed may be controlled by controlling the amount of fuel injected from the injector 1050.

When the engine 1000 is idling, the idling-time target phase setting unit 130 sets the target phase CAr based on a comparison between the target idle speed NIr and a predetermined rotational speed. For example, the predetermined rotational speed is set to a value between the above-described two target idle speeds NIr in order to distinguish them from each other.

Figure 15:
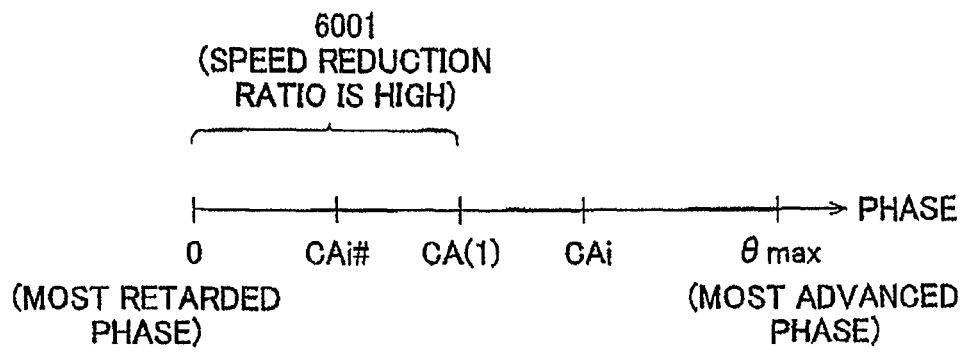
FIG. 15 is a graph illustrating the manner for setting a target valve phase that is used when an engine is idling.

As shown in FIG. 15, when the target idle speed NIr is equal to or higher than the predetermined rotational speed, the idling-time target phase setting unit 130 sets the target phase CAr for the intake valve 1100, which is controlled by the VVT mechanism 2000, to a phase CAi at which the optimum combustion state is achieved in the engine 1000 when the engine 1000 is idling (CAr=CAi).

In a hybrid vehicle, it is necessary to retard the valve phase when the engine 1000 is started by a relatively large amount to execute a pressure reduction control for reducing a shock that is likely to occur when the engine 1000, which is intermittently operated, is being started. Therefore, in the hybrid vehicle, the intake valve phase CAi may be outside the region 6001 (FIG. 12), in which the speed reduction ratio is high, due to the range, in which the valve phase is allowed to be controlled by the VVT mechanism 2000. In the embodiment of the invention, the phase CAi is within the region 6002 (FIG. 12) in which the speed reduction ratio is low.

On the other hand, when the target idle speed NIr is lower than the predetermined rotational speed, the idling-time target phase setting unit 130 sets the target phase CAr to a phase CAi# within the region 6001 in which the speed reduction ratio is high. Thus, the range, in which the valve phase is allowed to change when the engine 1000 is idling, is restricted within the region 6001 in which the speed reduction ratio is high.

As a result, in the state in which the operating noise of the VVT mechanism 2000 is relatively easily heard by an occupant such as the driver because of the relatively low target idle speed NIr and the small operating noise of the engine, the range, in which the phase of the intake valve 1100 is allowed to change, is restricted within the region 6001 in which the speed reduction ratio is high and the operating noise of the VVT mechanism 2000 is relatively small. As a result, it is possible to reduce the likelihood that the operating noise of the VVT mechanism 2000 is heard by the driver.

On the other hand, in the state in which it is less likely for the driver to hear the operating noise of the VVT mechanism 2000 because of the relatively high target idle speed NIr and the large operating noise of the engine, it is possible to execute the valve phase control in which higher priority is given to enhancement of the fuel efficiency than to suppression of the operating noise of the VVT mechanism 2000. That is, it is preferable to set the predetermined rotational speed with the relationship between the operating noise of the VVT mechanism 2000 when the valve phase is controlled outside the region 6001 in which the speed reduction ratio is high and the operating noise of the engine 1000 which changes in accordance with the engine speed.

Figure 16:
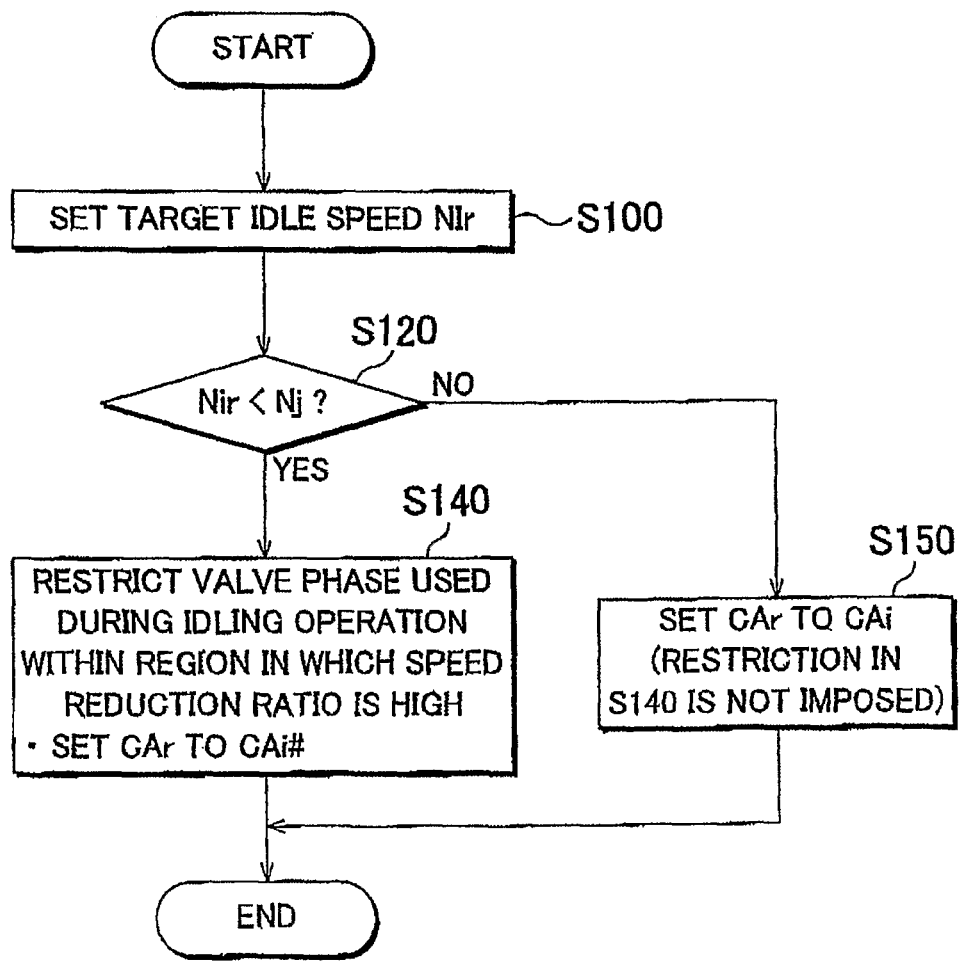
FIG. 16 is a flowchart for setting the target phase for the intake valve, which is used when the engine is idling, using a software process executed by an ECU according to the embodiment of the invention.

FIG. 16 is a flowchart according to which a control for setting the target phase for the intake valve, which is shown in FIG. 14, is executed using a software process executed by the ECU 100. The target phase for the intake valve is used when the engine is idling.

As shown in FIG. 16, the ECU 100 sets the target idle speed NIr in step (hereinafter, referred to as "S") 100. Namely, the process in S100 corresponds to the function of the target idle speed setting unit 110 in FIG. 14.

In addition, the ECU 100 compares the target idle speed NIr with a predetermined rotational speed Nj in S120. As described above, it is preferable to set the predetermined rotational speed Nj to a value corresponding to the lower limit value of the engine speed range in which it is less likely for the occupant such as the driver to hear the operating noise of the VVT mechanism 2000 when the valve phase is controlled outside the region 6001 in which the speed reduction ratio is high.

When an affirmative determination is made in S120, that is, when the target idle speed NIr is lower than the predetermined rotational speed Nj, the ECU 100 restricts the range, in which the valve phase is allowed to change when the engine is idling, within the region 6001 in which the speed reduction ratio is high. As described above, the valve phase is restricted in S140 by setting the target phase CAr, which is used when the engine is idling, to the phase CAi# in the region 6001 in which the speed reduction ratio is high.

Meanwhile, when a negative determination is made in S120, that is, when the target idle speed NIr is equal to or higher than the predetermined rotational speed Nj, the ECU 100 does not restrict the range, in which the phase is allowed to change, unlike in S149, and sets the target phase CAr at which higher priority is given to achievement of a more appropriate combustion state in the engine 1000 (CAr=CAi).

Namely, the processes in S120, S140 and S150 correspond to the function of the idling-time target phase setting unit 130 in FIG. 14.

As described above, with the control unit for a variable valve timing mechanism according to the embodiment of the invention, when the target idle speed is variably set based on the vehicle state, if the target idle speed is set to a relatively low value and the operating noise of the VVT mechanism 2000 is easily heard by the occupant such as the driver, the range, in which the valve phase is allowed to change, is restricted within the region 6001 in which the speed reduction region is high. Thus, it is possible to avoid the situation in which the operating noise of the VVT mechanism 2000 is heard by the occupant such as the driver.

On the other hand, when the target idle speed is set to a relatively high value and it is less likely for the driver to hear the operating noise of the VVT mechanism 2000, higher priority is given to the efficiency of combustion that takes place in the engine 1000. Therefore, it is possible to appropriately control the valve phase without imposing the above-described restriction.

Figure 17:
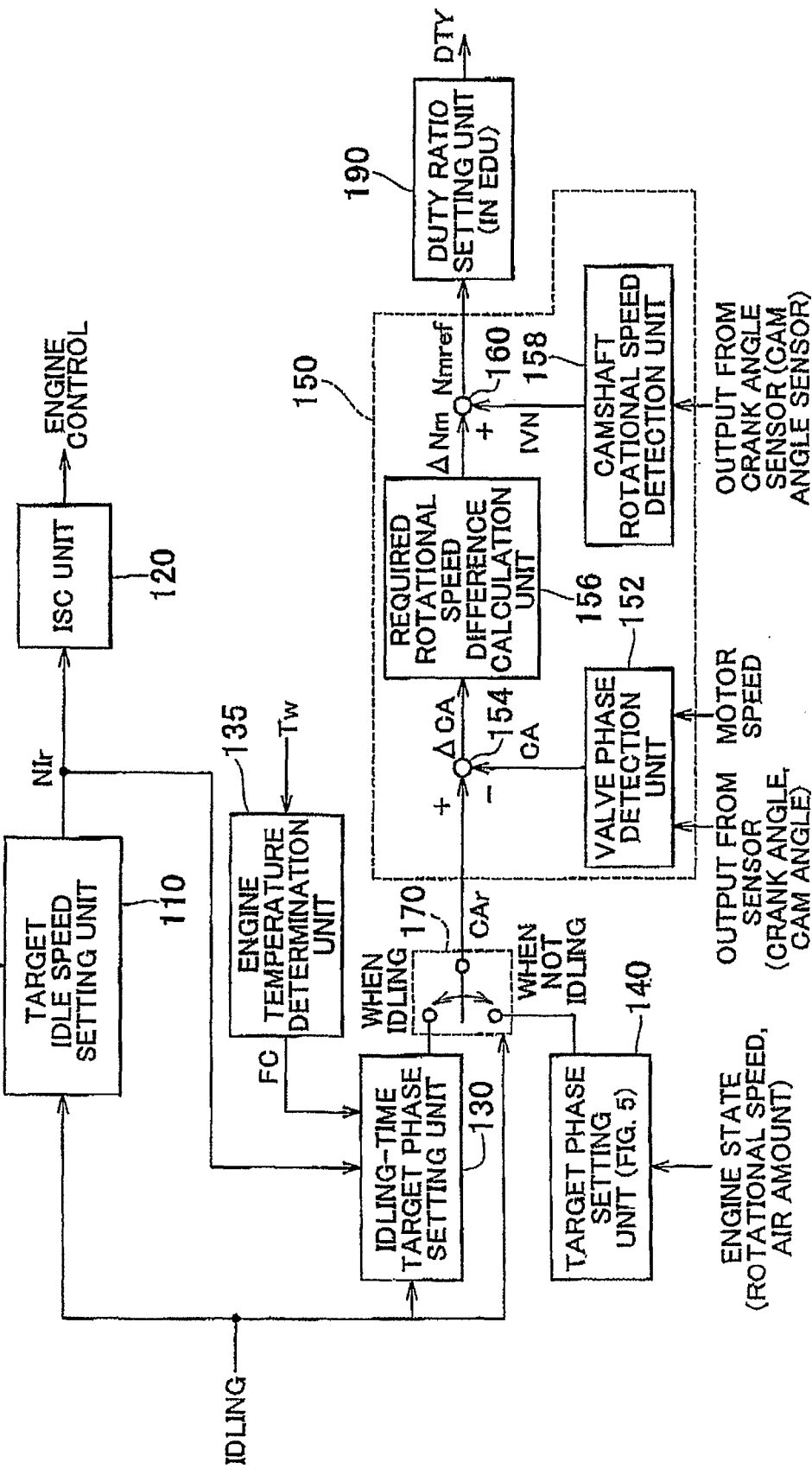
FIG. 17 is a block diagram illustrating the configuration of a control executed over the variable valve timing mechanism according to a modified example of the embodiment of the invention.

FIG. 17 is a block diagram showing the configuration of a control executed by a control unit for a variable valve timing mechanism according to a modified example of the embodiment of the invention.

The control unit for a variable valve timing mechanism according to the modified example of the embodiment of the invention, shown in FIG. 17, differs from the control unit shown in FIG. 14 in that an engine temperature determination unit 135 is further provided. The engine temperature determination unit 135 obtains an engine coolant temperature Tw based on a signal output from the coolant temperature sensor 5020 (FIG. 4) provided to the engine 1000, and determines whether the engine 1000 is cold based on the comparison between the engine coolant temperature Tw and a reference temperature Tj. When the engine coolant temperature Tw is equal to or lower than the reference temperature Tj, the engine temperature determination unit 135 determines that the engine 1000 is cold and turns on a flag FC.

In the case where the flag FC is turned on by the engine temperature determination unit 135, as in the case where the target idle speed NIr described above is set to a value lower than the predetermined rotational speed, the idling-time target phase setting unit 130 sets the target phase CAr to the phase CAi# within the region 6001 in which the speed reduction ratio is high.

Thus, when the engine is idling while it is cold, the range, in which the phase of the intake valve 1100 is allowed to change, is restricted within the region 6001 in which the speed reduction ratio is high.

Because the functions and operations of the other blocks are the same as those in FIG. 14, the detailed description thereof will not be provided below.

FIG. 18 is a flowchart according to which a control for setting the target phase for the intake valve, which is shown in FIG. 17, is executed using a software process executed by the ECU 100. The target phase for the intake valve is used when the engine is idling.

The flowchart in FIG. 18 differs from the flowchart in FIG. 16 in that the control unit for a variable valve timing mechanism according to the modified example of the embodiment of the invention executes S130 and S135 in addition to S100, S120, S140 and S150 in FIG. 16.

The ECU 100 obtains the engine coolant temperature Tw in S130, and determines in S135 whether the engine 1000 is cold by determining whether the engine coolant temperature Tw is equal to or lower than the reference temperature Tj.

When it is determined that the engine 1000 is cold ("YES" in S135), the ECU 100 restricts the range, in which the phase of the intake valve 1100 is allowed to change, in S140.

On the other hand, when it is determined that the engine coolant temperature Tw is higher than the reference temperature Tj ("NO" in S135, that is, when the engine 1000 is warm), the ECU 100 executes S150 if the target idle speed NIr is equal to or higher than the predetermined rotational speed Nj. That is, the range, in which the phase of the intake valve 1100 is allowed to change, is not restricted.

As described with reference to FIG. 12, the intake valve phase when the engine stops needs to be within the region 6001 in which the speed reduction ratio is high, in order to prevent an unintentional change in the intake valve phase. Therefore, when a command to stop the engine is issued automatically or in response to an operation performed by the driver while the engine is idling, the phase of the intake valve 1100 needs to be brought into the region 6001 by the VVT mechanism 2000 by the time when the engine is actually stopped. However, when the engine 1000 is cold, there is a possibility that the valve phase is not changed by a sufficient amount by the VVT mechanism 2000 due to an increase in friction at each portion, unlike the case where the engine is warm and the lubrication is sufficiently ensured.

Therefore, with the control unit for a variable valve timing mechanism according to the modified example of the embodiment of the invention, when the engine 1000 is cold, the range, in which the valve phase is allowed to change, is restricted within the region 6001 in which the speed reduction ratio is high. Thus, it is possible to reliably avoid the situation in which the phase is unintentionally changed, for example, the actual valve phase deviates from the phase used in the control.

With the control unit for a variable valve timing mechanism according to the modified example of the embodiment of the invention, the target valve phase CAr which is used when the engine is idling is set based on both the target idle speed and the engine coolant temperature (when the engine is cold/when the engine is not cold). However, the target valve phase CAr which is used when the engine is idling may be set based only on the engine coolant temperature (when the engine is cold/when the engine is not cold).

The embodiment of the invention that has been described in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A control unit for a variable valve timing mechanism that changes opening/closing timing of at least one of an intake valve or an exhaust valve of an internal combustion engine by a change amount that corresponds to an operation amount of an actuator, and that is configured such that a control range, in which the opening/closing timing is allowed to be controlled by the variable valve timing mechanism, includes a first region and a second region, and a ratio of allowable valve phase change amount of the opening/closing timing with respect to the operation amount of the actuator is lower when the opening/closing timing is within the first region than when the opening/closing timing is within the second region, the control unit comprising:
a target idle speed setting unit that is configured to variably set a target idle speed for the internal combustion engine, which is used when the internal combustion engine is idling, based on a vehicle state; and
a phase restriction unit that is configured to restrict a valve phase range in which the opening/closing timing is changed by the variable valve timing mechanism, within the first region, when the target rotational speed that is set by the target idle speed setting unit is lower than a predetermined rotational speed,
wherein the phase restriction unit is configured to not restrict the valve phase range in which the opening/closing timing is changed by the variable timing valve mechanism when the target rotational speed that is set by the target idle speed setting unit is equal to or higher than the predetermined rotational speed.

2. The control unit according to claim 1, wherein the predetermined rotational speed is set to a value that corresponds to a lower limit value of a rotational speed range in which there is reduced operating noise of the variable valve timing mechanism when the opening/closing timing is controlled outside the first region.

3. The control unit according to claim 1, further comprising:
an actuator control unit that controls the operation amount of the actuator based on a deviation of a current value of the opening/closing timing from a target value of the opening/closing timing,
wherein the phase restriction unit includes a target phase setting unit that sets the target value of the opening/closing timing to a value within the first region while the internal combustion engine is idling.

4. The control unit according to claim 3, wherein the target phase setting unit sets the target value of the opening/closing timing to a value within the second region, in a case that the range in which the opening/closing timing is changed by the variable valve timing mechanism need not be restricted within the first region.

5. The control unit according to claim 4, further comprising a temperature determination unit that determines whether a temperature of the internal combustion engine is equal to or lower than a predetermined reference temperature,
wherein the case that the range in which the opening/closing timing is changed by the variable valve timing mechanism need not be restricted within the first region includes at least a case in which the target rotational speed set by the target idle speed setting unit is equal to or higher than the predetermined rotational speed or a case in which the temperature determination unit determines that the temperature of the internal combustion engine is higher than the predetermined reference temperature.

6. The control unit according to claim 1, wherein the internal combustion engine is mounted in a vehicle that travels in a cruise mode that is selected from among cruise modes including a first cruise mode in which the vehicle travels using drive power generated by the internal combustion engine and a second cruise mode in which the internal combustion engine is stopped and the vehicle travels using drive power generated by a drive power source that differs from the internal combustion engine.

7. The control unit according to claim 1, wherein the first region is closer to a most retarded phase than is the second region.

8. The control unit according to claim 1, wherein:
the actuator includes an electric motor; and
the operation amount of the actuator is a rotational speed of the electric motor relative to a rotational speed of a camshaft that drives the valve of which the opening/closing timing is changed.

9. A control unit for a variable valve timing mechanism that changes opening/closing timing of at least one of an intake valve or an exhaust valve of an internal combustion engine by a change amount that corresponds to an operation amount of an actuator, and that is configured such that a control range, in which the opening/closing timing is allowed to be controlled by the variable valve timing mechanism, includes a first region and a second region, and a ratio of allowable valve phase change amount of the opening/closing timing with respect to the operation amount of the actuator is lower when the opening/closing timing is within the first region than when the opening/closing timing is within the second region, the control unit comprising:
a temperature determination unit that is configured to determine whether a temperature of the internal combustion engine is equal to or lower than a predetermined reference temperature; and
a phase restriction unit that is configured to restrict a valve phase range in which the opening/closing timing is changed by the variable valve timing mechanism, within the first region, when it is determined that the temperature of the internal combustion engine is equal to or lower than the predetermined reference temperature while the internal combustion engine is idling,
wherein the phase restriction unit is configured to not restrict the valve phase range in which the opening/closing timing is changed by the variable valve timing mechanism when it is determined that the temperature of the internal combustion engine is higher than the predetermined reference temperature while the internal combustion engine is idling.

10. The control unit according to claim 9, wherein the ratio of the change amount of the opening/closing timing with respect to the operation amount of the actuator in the first region is constant.

11. The control unit according to claim 9, wherein the ratio of the change amount of the opening/closing timing with respect to the operation amount of the actuator in the second region is constant.

12. The control unit according to claim 9, further comprising:
an actuator control unit that controls the operation amount of the actuator based on a deviation of a current value of the opening/closing timing from a target value of the opening/closing timing,
wherein the phase restriction unit includes a target phase setting unit that sets the target value of the opening/closing timing to a value within the first region while the internal combustion engine is idling.

13. The control unit according to claim 12, wherein the target phase setting unit sets the target value of the opening/closing timing to a value within the second region in a case that the range in which the opening/closing timing is changed by the variable valve timing mechanism need not be restricted within the first region.

14. The control unit according to claim 13, further comprising a target idle speed setting unit that variably sets a target rotational speed for the internal combustion engine, which is used when the internal combustion engine is idling, based on a vehicle state,
wherein the case that the range in which the opening/closing timing is changed by the variable valve timing mechanism need not be restricted within the first region includes at least a case in which the target rotational speed set by the target idle speed setting unit is equal to or higher than the predetermined rotational speed or a case in which the temperature determination unit determines that the temperature of the internal combustion engine is higher than the predetermined reference temperature.

15. The control unit according to claim 9, wherein the internal combustion engine is mounted in a vehicle that travels in a cruise mode that is selected from among cruise modes including a first cruise mode in which the vehicle travels using drive power generated by the internal combustion engine and a second cruise mode in which the internal combustion engine is stopped and the vehicle travels using drive power generated by a drive power source that differs from the internal combustion engine.

16. The control unit according to claim 9, wherein the first region is closer to a most retarded phase than is the second region.

17. The control unit according to claim 9, wherein:
the actuator includes an electric motor; and
the operation amount of the actuator is a rotational speed of the electric motor relative to a rotational speed of a camshaft that drives the valve of which the opening/closing timing is changed.

18. The control unit according to claim 9, further comprising:
a target idle speed setting unit that variably sets a target rotational speed for the internal combustion engine, which is used when the internal combustion engine is idling, based on a vehicle state,
wherein the phase restriction unit restricts the range in which the opening/closing timing is changed by the variable valve timing mechanism within the first region, when the target rotational speed set by the target idle speed setting unit is lower than a predetermined rotational speed.

19. A control method for a variable valve timing mechanism that changes opening/closing timing of at least one of an intake valve or an exhaust valve of an internal combustion engine by a change amount that corresponds to an operation amount of an actuator, and that is configured such that a control range, in which the opening/closing timing is allowed to be controlled by the variable valve timing mechanism, includes a first region and a second region, and a ratio of allowable valve phase change amount of the opening/closing timing with respect to the operation amount of the actuator is lower when the opening/closing timing is within the first region than when the opening/closing timing is within the second region, the control method comprising:
variably setting a target idle speed for the internal combustion engine, which is used when the internal combustion engine is idling, based on a vehicle state; and
restricting a valve phase range in which the opening/closing timing is changed by the variable valve timing mechanism, within the first region, when the target rotational speed for the internal combustion engine is lower than a predetermined rotational speed while the internal combustion engine is idling; and
not restricting the valve phase range in which the opening/closing timing is changed by the variable valve timing mechanism when the target rotational speed is equal to of higher than the predetermined rotational speed.

20. The control method according to claim 19, wherein the internal combustion engine is mounted in a vehicle that travels in a cruise mode that is selected from among cruise modes including a first cruise mode in which the vehicle travels using drive power generated by the internal combustion engine and a second cruise mode in which the internal combustion engine is stopped and the vehicle travels using drive power generated by a drive power source that differs from the internal combustion engine.

21. The control method according to claim 19, wherein:
the actuator includes an electric motor; and
the operation amount of the actuator is a rotational speed of the electric motor relative to a rotational speed of a camshaft that drives the valve of which the opening/closing timing is changed.

22. A control method for a variable valve timing mechanism that changes opening/closing timing of at least one of an intake valve or an exhaust valve of an internal combustion engine by a change amount that corresponds to an operation amount of an actuator, and that is structured such that a control range, in which the opening/closing timing is allowed to be controlled by the variable valve timing mechanism, includes a first region and a second region, and a ratio of allowable valve phase change amount of the opening/closing timing with respect to the operation amount of the actuator is higher when the opening/closing timing is within the first region than when the opening/closing timing is within the second region, the control method comprising:
determining whether a temperature of the internal combustion engine is equal to or lower than a predetermined reference temperature;
restricting a valve phase range in which the opening/closing timing is changed by the variable valve timing mechanism, within the first region, when it is determined that the temperature of the internal combustion engine is equal to or lower than the predetermined reference temperature while the internal combustion engine is idling; and
not restricting the valve phase range in which the opening/closing timing is changed by the variable valve timing mechanism when it is determined that the temperature of the internal combustion engine is higher than the predetermined reference temperature while the internal combustion engine is idling.

23. The control method according to claim 22, wherein the internal combustion engine is mounted in a vehicle that travels in a cruise mode that is selected from among cruise modes including a first cruise mode in which the vehicle travels using drive power generated by the internal combustion engine and a second cruise mode in which the internal combustion engine is stopped and the vehicle travels using drive power generated by a drive power source that differs from the internal combustion engine.

24. The control method according to claim 22, wherein:
the actuator includes an electric motor; and
the operation amount of the actuator is a rotational speed of the electric motor relative to a rotational speed of a camshaft that drives the valve of which the opening/closing timing is changed.

* * * * *